United States Patent
Müller

(10) Patent No.: US 6,810,193 B1
(45) Date of Patent: Oct. 26, 2004

(54) CASSETTE FOR RECEIVING OPTICAL WAVEGUIDES WITH OVERLENGTHS AND FIBER SPLICES

(75) Inventor: Thorsten Müller, Menden (DE)

(73) Assignee: CCS Technology, Inc., Wilmington, DE (US)

( * ) Notice: Subject to any disclaimer, the term of this patent is extended or adjusted under 35 U.S.C. 154(b) by 112 days.

(21) Appl. No.: 10/130,799

(22) PCT Filed: Nov. 22, 2000

(86) PCT No.: PCT/DE00/04111
§ 371 (c)(1),
(2), (4) Date: Aug. 21, 2002

(87) PCT Pub. No.: WO01/38917
PCT Pub. Date: May 31, 2001

(30) Foreign Application Priority Data

Nov. 22, 1999 (DE) ......................................... 199 56 067

(51) Int. Cl.[7] .................................................. G02B 6/00
(52) U.S. Cl. ....................................... 385/135; 385/134
(58) Field of Search .................................. 385/134–136

(56) References Cited

U.S. PATENT DOCUMENTS

| 5,206,927 A | 4/1993 | Finzel et al. ................. 385/135 |
| 5,781,686 A | 7/1998 | Robinson et al. ........... 385/135 |
| 6,112,006 A | * 8/2000 | Foss ........................... 385/135 |
| 6,496,638 B1 | * 12/2002 | Andersen ..................... 385/135 |

FOREIGN PATENT DOCUMENTS

| DE | 4438668 A1 | 5/1996 | ............ G02B/6/36 |
| EP | 0333316 A2 | 9/1989 | ............ G02B/6/44 |
| EP | 0872750 A2 | 10/1998 | ............ G02B/6/44 |
| WO | WO95/07482 | 3/1995 | ............ G02B/6/44 |

* cited by examiner

*Primary Examiner*—John D. Lee
*Assistant Examiner*—Tina M Lin

(57) ABSTRACT

The invention relates to a cassette (KA) or cassette base plate (KG) for receiving optical wave guides with overlengths. Additional elements for entries, pivoting elements and fixing elements which can be removed if needed, respectively, are located on said cassette base plate (KG). This ensures that the cassettes (K) or cassette base plates (KG) are universally usable.

27 Claims, 28 Drawing Sheets

CASSETTE FOR RECEIVING OPTICAL WAVEGUIDES WITH OVERLENGTHS AND FIBER SPLICES

FIELD OF THE INVENTION

This invention relates to a cassette for accommodating optical waveguides with excess lengths and optical waveguide splices, break-out webs and circular guide elements for the optical waveguides introduced and splice fixing means for the optical waveguide splices being arranged on a cassette base plate.

BACKGROUND OF THE INVENTION

EP 0 872 750-A2 discloses a cable sleeve with a retaining arrangement for cassettes for storing and splicing optical waveguides. The individual cassettes are arranged for swing action on a cassette carrier, the cassettes being arranged one above the other and being capable of being swung upward into operating positions. Two circular guide elements with break-out webs are located on the cassette base plate, with the result that it is ensured that optical waveguides introduced cannot spring out of position.

DE 44 38 668-A1 discloses a cassette which is intended for storing optical-waveguide excess lengths and optical waveguide splices and comprises one or more basic modules. These basic modules are each of the same basic construction and may be assembled, depending on requirements, with the aid of connecting elements. Here too, circular guide elements are provided for the optical waveguides.

WO 95/07482, furthermore, discloses a cassette for accommodating optical waveguides with excess lengths, the optical waveguides being introduced and/or led out at groove-like inlets. The excess lengths here may be positioned around approximately circular guide elements. Here too, break-out webs prevent the optical waveguides introduced from springing out.

SUMMARY OF THE INVENTION

An object of the invention, then, is to provide a cassette for accommodating optical waveguides with excess lengths that can be used, and is optimized, as universally as possible for a wide range of different use purposes in respect to the arrangement itself, in respect to the variety of inlet ports for the wide range of different types of optical waveguide and in respect to the accessibility.

One object set is achieved according to the invention by a cassette of the type mentioned in that there are provided two circular guide elements and a cross-form guide element, located between the two circular guide elements, for the optical-waveguide excess lengths, in that differently shaped splice-protection holders are provided for accommodating different embodiments of splice-protection elements, in that pivoting elements are provided both for vertical and for horizontal pivoting of the cassette, in that the introduction regions are equipped for the introduction of optical waveguides and/or optical waveguide strips and/or optical waveguide connectors, and in that additional elements and/or accessories are arranged on the cassette base plate for adaptation to the respective use purpose.

One advantage of the cassette construction according to the invention over the prior art is that this cassette can be used for accommodating a wide range of different configurations of optical waveguides, such as individual fibers, strips or bundle tubes or optical waveguide terminations, such as optical waveguide connectors, in particular so-called pigtails, which are optical waveguide ends with connectors fixed thereon. A further advantage is that satisfactory guidance of the optical waveguides introduced is ensured by two circular guide elements, which maintain in each case the permissible minimum radii of the optical waveguides, and by a cross-form guide element located therebetween, the possibility of guidance in a FIG. 8 making it possible to reach every outlet and inlet point of the cassette. In the case of the introduction of optical waveguides with connector termination (pigtail), an accommodating adapter may be inserted in front of the inlet ports of the cassette base plate, arrangements for accommodating the connectors being located on said adapter. Likewise on this inlet side, a vertical pivoting element may be attached there, which makes it possible for the cassette base plate to be swung down laterally from a vertical position. A corresponding step-design holder for vertical pivoting makes it possible to achieve the situation where, by virtue of cassette base plates that are arranged one beside the other being pivoted down laterally, access can be gained to said base plates without them having to be removed from the cassette assembly.

A further advantage is that corresponding arrangements and installations in the form of splice holders make it possible for all possible types of optical waveguide splice protectors to be fixed on the cassette base plate. Moreover, additional elements or accessories are latched, or fixed by break-out webs, in the interiors of the circular guide elements, it being possible for these, depending on the use purpose and requirements, to be removed or broken off. With the aid of these additional elements or accessories, it is possible to assemble, for example, cassette base plates to form stacks, the access to each individual cassette base plate being maintained. For this purpose, for example, hinge parts and closure clips are required. Moreover, mounts for optical waveguide strips or individual optical fibers are fixed in the same way in the interiors of the guide elements or accessories, it being possible for these, following removal, to be inserted into the respective regions of the inlet ports on the cassette base plate. Finally, in this exemplary embodiment, special fastening elements are also provided as additional elements or accessories, it being possible for the cassette base plate to have these fitted on the outside, either on the narrow side or on the rear plate side. With the aid of these fastening elements, it is then also possible for said cassette base plate to be fitted, and fastened, on corresponding mating elements on the framework or the like.

Furthermore, a cassette transition is provided in the central region of the cassette base plate, on the longitudinal pivoting side, it being possible for optical waveguides to be passed on from one cassette to a parallel cassette by way of said transition.

BRIEF DESCRIPTION OF THE DRAWINGS

The invention will now be explained in more detail hereinbelow, with reference to a plurality of embodiments, in 28 figures.

DETAILED DESCRIPTION OF THE INVENTION

Figure 1:
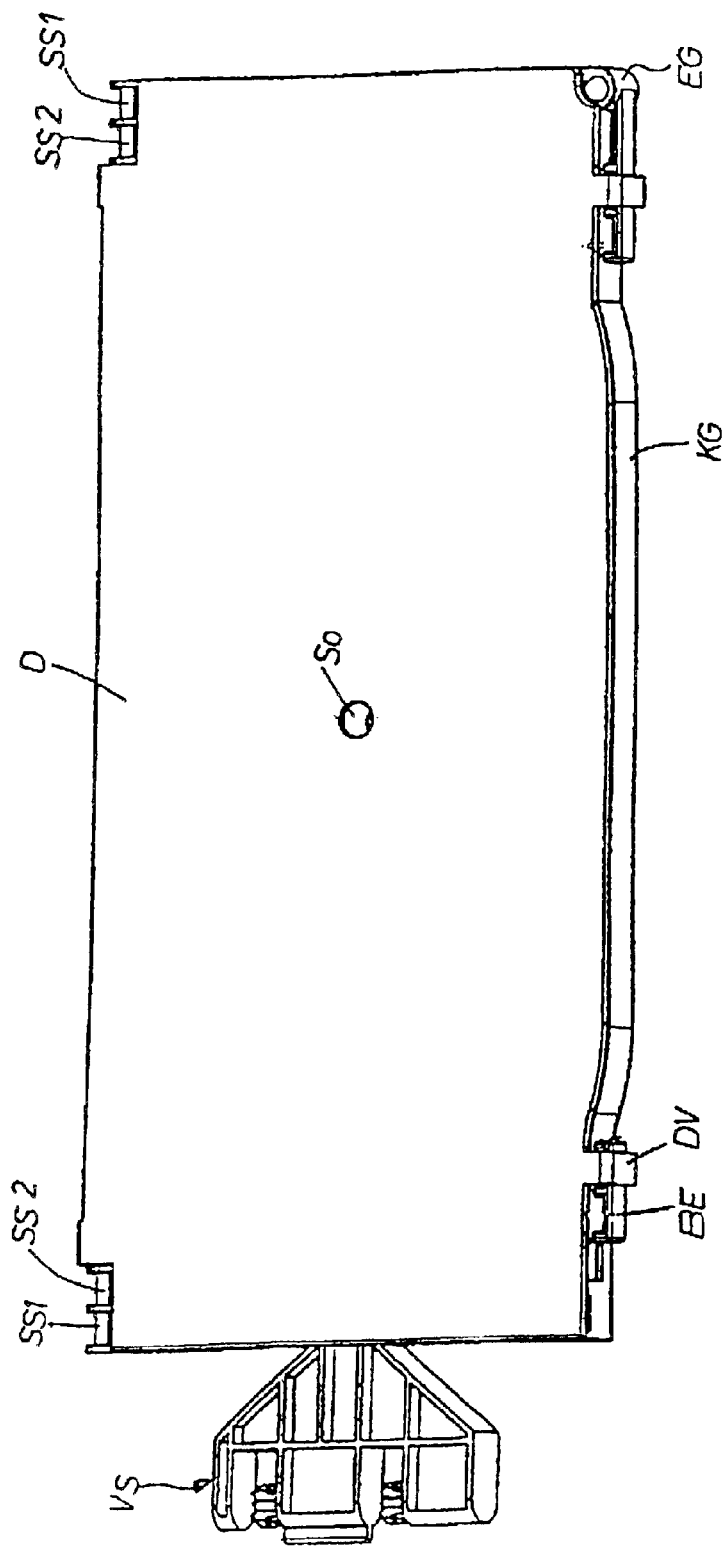
FIG. 1 shows a closed cassette base plate with a vertical pivoting element.

FIG. 1 illustrates a cassette base plate KG which is closed off by cover D and in the case of which a vertical pivoting element VS is attached to one narrow side. Arranged on the longitudinal swing-action side of the cassette base plate KG are hinge pins SS1 and SS2 into which it is possible to clip additional elements in order for cassette base plates KG to be stacked one upon the other, as will be explained at a later stage in the text. Arranged on the opposite narrow side of the cassette base plate KG are fastening elements BE, into a sub-region of which it is possible to snap the cover closures DV, although they may also serve for the insertion of additional elements. Provided in the center of the cassette base plate KG is a stacking opening SO which also passes through the cover D and into which, for example, a stacking mandrel can be guided.

Figure 2:
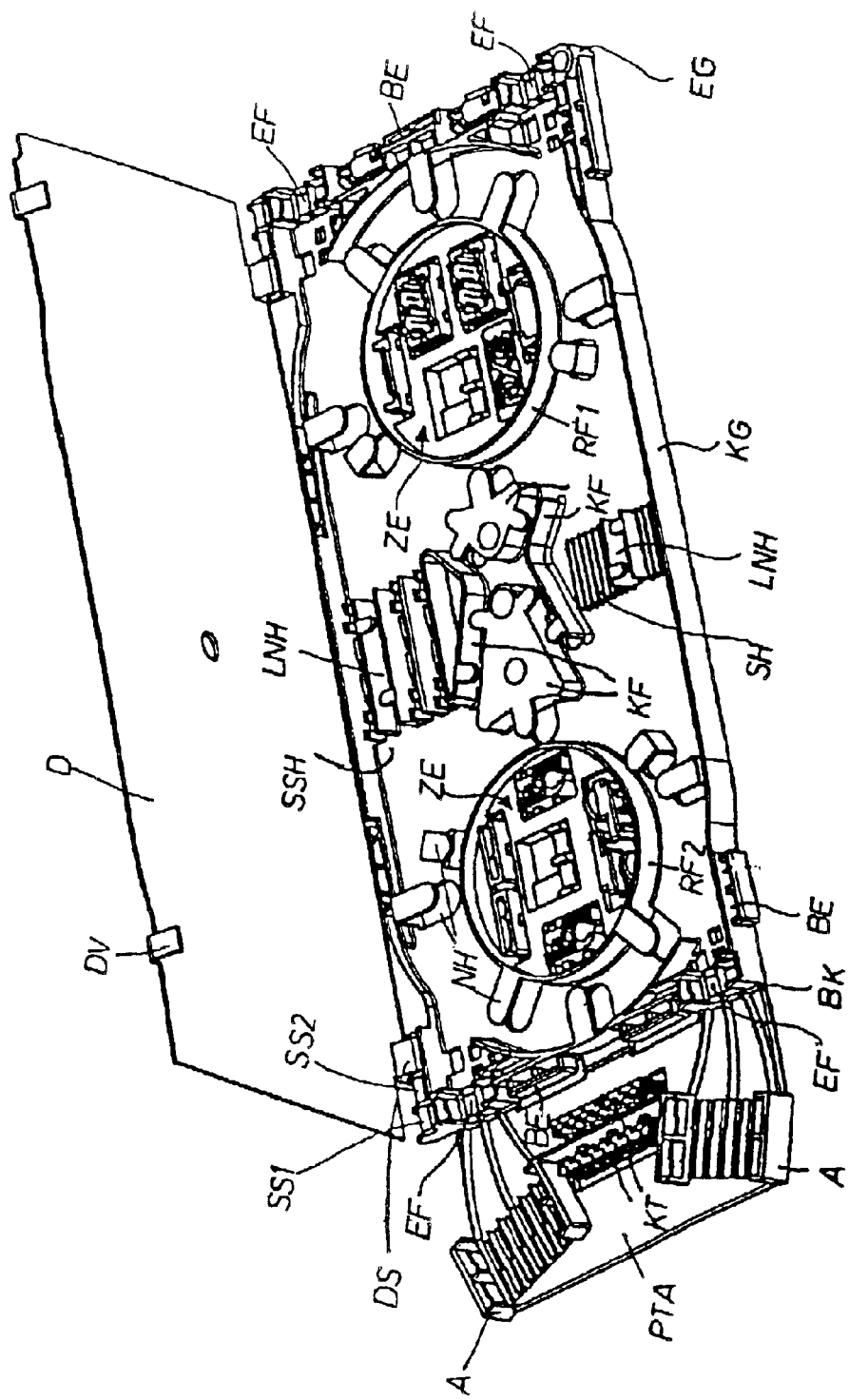
FIG. 2 shows a first embodiment of an open cassette base plate with an accommodating adapter for optical waveguides with connector terminations.

FIG. 2 shows the cassette base plate KG in the open state, with the result that it is possible to see the position of the two circular guide elements RF1 and RF2 with the cross-form guide element KF located therebetween. The optical waveguides introduced may also be guided and stored in a FIG. 8 by way of these guide elements, this making it possible for said optical waveguides to be guided to each inlet port and/or outlet port EF of the cassette base plate KG. The narrow side of the cassette base plate KG here is provided with an accommodating adapter PTA for the introduction of optical waveguides with connector terminations, e.g., so-called pigtails. The connectors are then positioned in the mounts A and fixed by clamping parts KT, which are likewise arranged on said accommodating adapter PTA, such that they can be broken off. In this case, the accommodating adapter PTA has already been fastened on the cassette base plate KG via a break-off edge BK, but it can be removed by being bent along said break-off edge BK. The cover is fastened for swing action on the cassette base plate KG by a cover hinge DS. It can also be seen in the illustration that arranged on the guide elements, as well as in the rest of the cassette base plate KG, are holding-down means NH and LNH, by means of which the optical waveguides introduced are prevented from springing out.

Provided in the central region of the cassette base plate KG are splice-protection holders SH for different splice protectors, e.g. for accommodating a shrink-tube splice SSH. For the longitudinal guidance of optical waveguides, in this region, holding-down means LNH are also incorporated in the arrangement of the splice-protection holders SH or SSH. Arranged in a corner region of the cassette base plate KG is a bore for a corner articulation EG, into which a pin can be plugged such that it extends beyond a plurality of cassette base plates, this making it possible for an individual cassette base plate KG to be pivoted out of the composite block.

Figure 3:
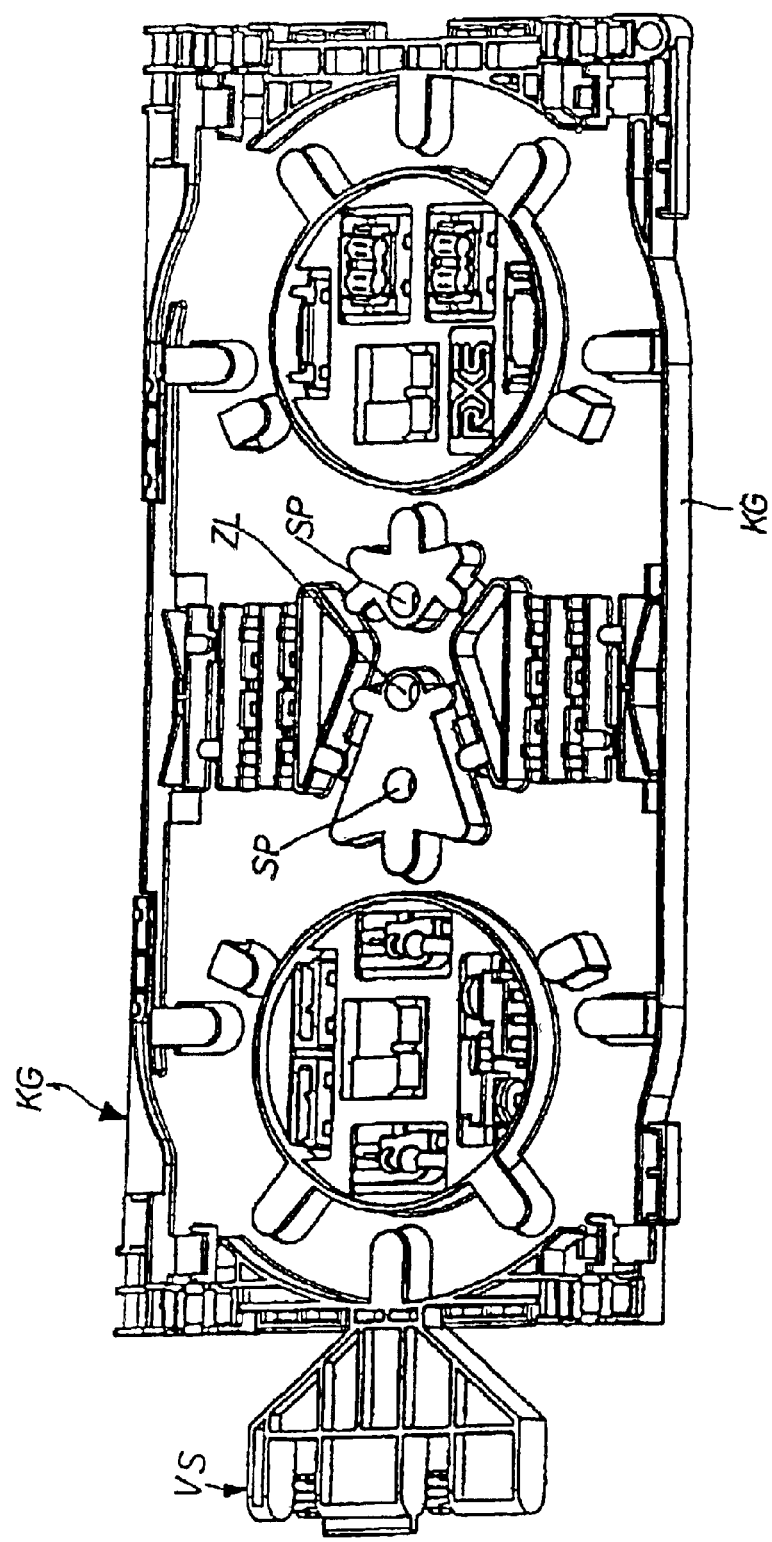
FIG. 3 shows a second embodiment of an open cassette base plate with a vertical pivoting element.

FIG. 3 shows a cassette base plate KG with a vertical pivoting element VS attached to the narrow side, by way of which the cassette base plate KG is latched into a special holder for such pivoting elements. Moreover, different a splice-protection holders are provided in turn. A central hole ZL is congruent with the stacking opening SO in the cover, which has been removed here. Screw-connection points SP allow fastening using screws.

Figure 4:
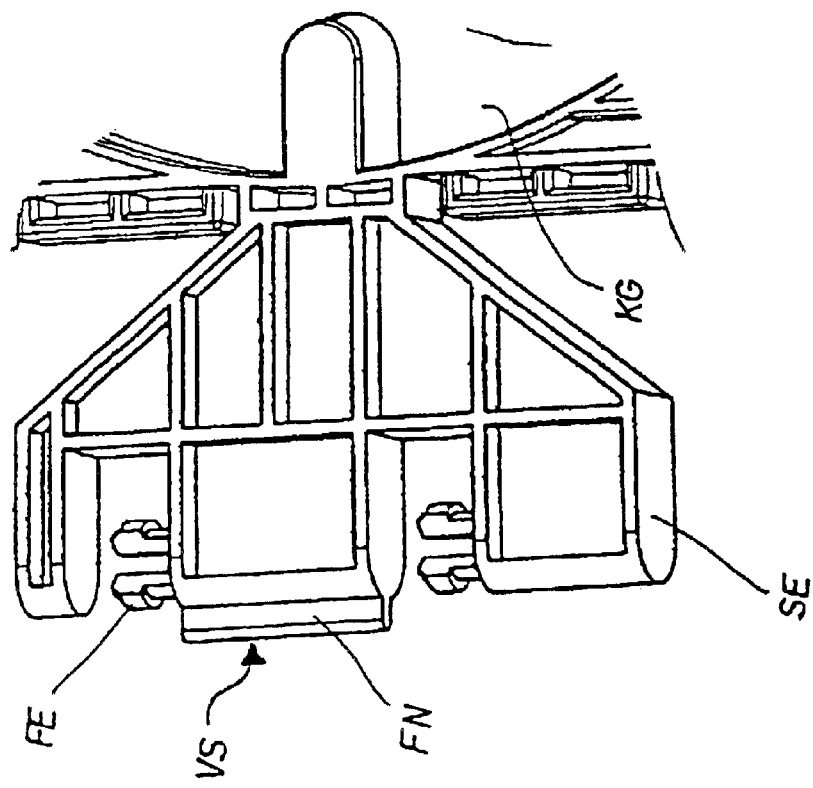
FIG. 4 shows the vertical pivoting element.

FIG. 4 illustrates a vertical pivoting element VS which, for example, is integrally formed on the narrow side of the cassette base plate KG. This pivoting element VS is inserted into a corresponding holder by way of the hinge elements SE, a resilient latching-in action taking place by way of resilient elements FE in the form of longitudinally split pins. Moreover, a fixing nose FN is integrally formed on the pivoting element and makes it possible to fix the vertical position of the cassette base plate KG.

Figure 5:
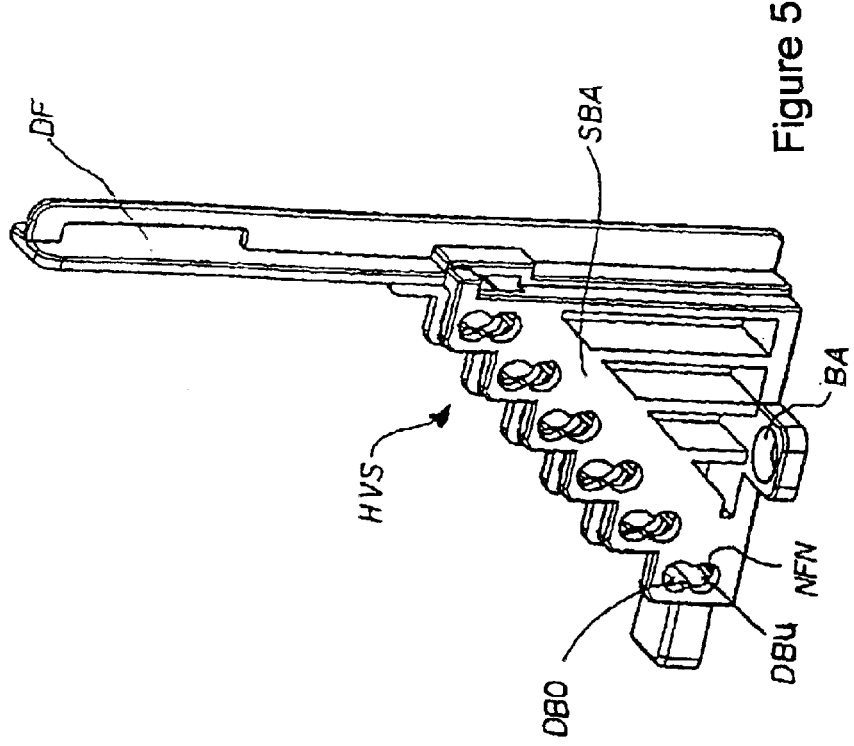
FIG. 5 shows a holder for accommodating the vertical pivoting elements.

FIG. 5 shows the step-like holder RVS for the vertical pivoting elements, a double bore DBO-DBU, in which the bores merge one into the other, being made in each step of the fastening arrangement SBA. The resilient elements of a vertical pivoting element are latched into said double bore DBO-DBU, the resilient action allowing latching both in the top bore DBO and in the bottom bore DBU. This makes it possible for the cassette base plates KG to be swung down laterally one above the other until the desired cassette base plate KG or cassette K has been reached. Fixing in the vertical position takes place by way of the fixing nose FN (see FIG. 4) engaging in the fixing groove NFN. Arranged in the vertical reinforcing part of the holder HVS is a through-passage opening DF through which a fastening strap can be guided. The holder HVS may be fastened in the framework by way of a fastening attachment BA.

Figure 6:
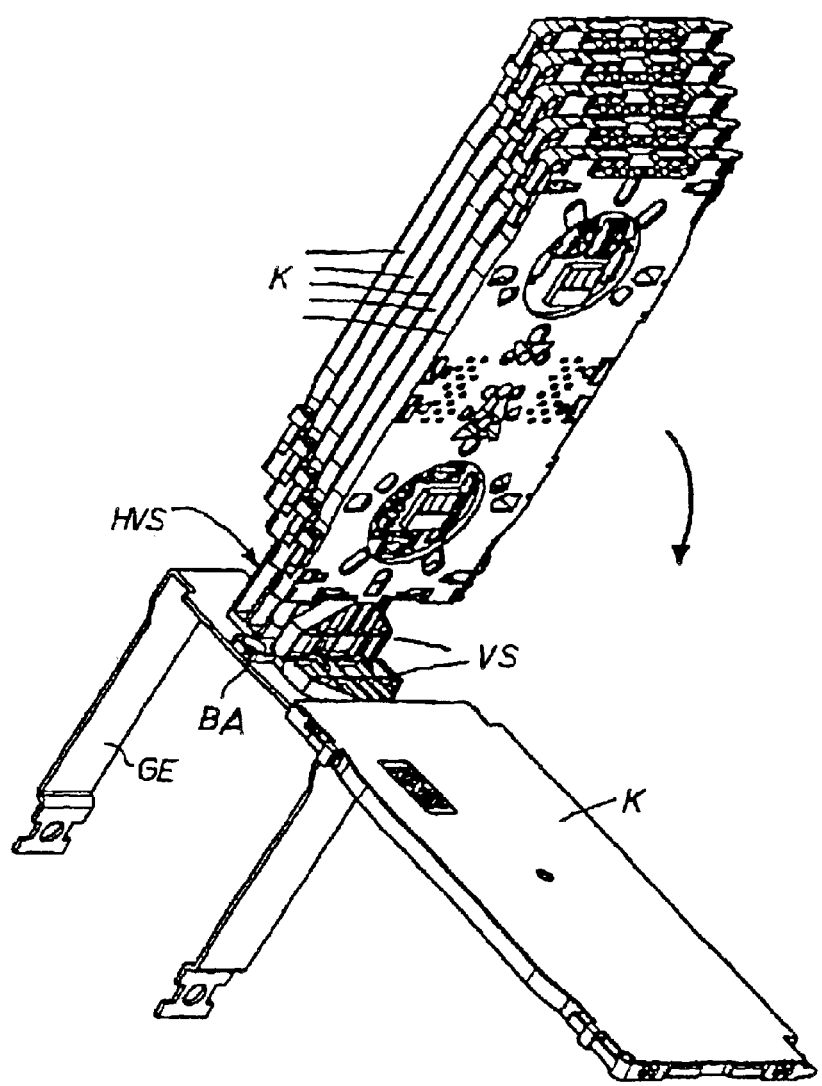
FIG. 6 shows a vertical arrangement of a plurality of cassette base plates.

FIG. 6, then, shows a composite arrangement of cassettes K, comprising a cassette base plate KG with a pivoting element and a cover, which are retained vertically in the holder HVS by way of their vertical pivoting elements VS. One of these cassettes K has been swung out laterally into the horizontal position, as is indicated by the arrow. The entire arrangement is fastened on a framework element GE by way of the fastening attachment BA.

Figure 7:
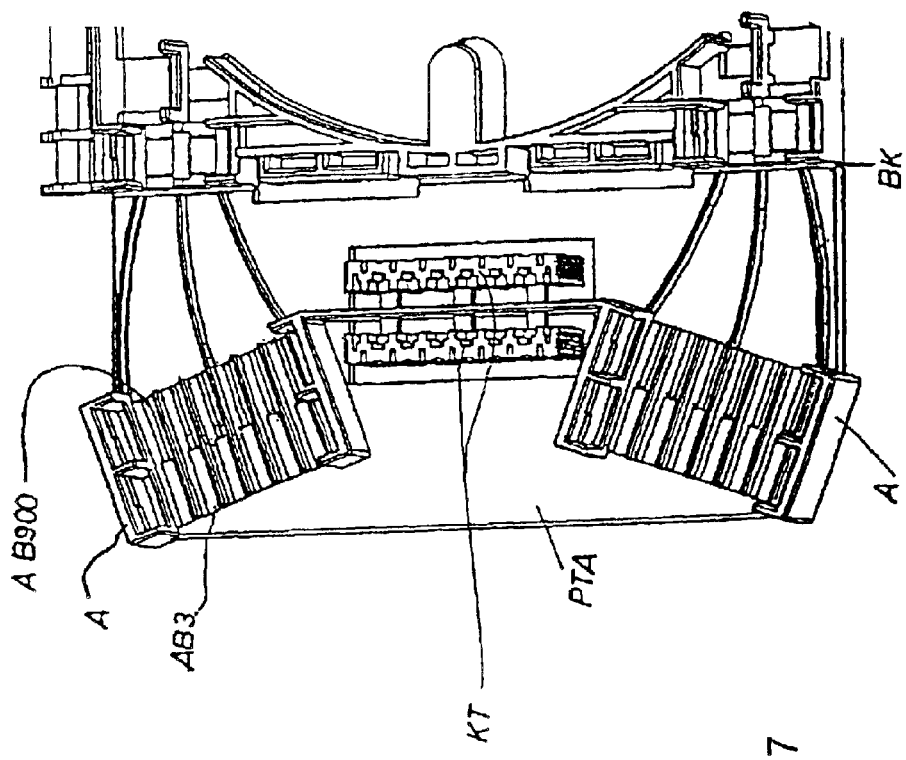
FIG. 7 shows an accommodating holder for optical waveguide connectors.

FIG. 7 shows that the mounts A of the accommodating adapter PTA, for accommodating optical waveguides with connectors such as pigtails, have two accommodating regions AB3 and AB900. The accommodating region AB3 is configured here, for example, for accommodating connectors of 3 millimeters in diameter and the accommodating region AB900 is configured for accommodating connectors of 900 micrometers in diameter, although other dimensions are also possible. Once the connectors have been introduced, they are fixed by the clamping parts KT, these having already been arranged on the accommodating adapter PTA such that they can be optionally latched or broken off. It is possible for the accommodating adapter to be broken off via the break-off edge BK if it is not being used.

Figure 8:
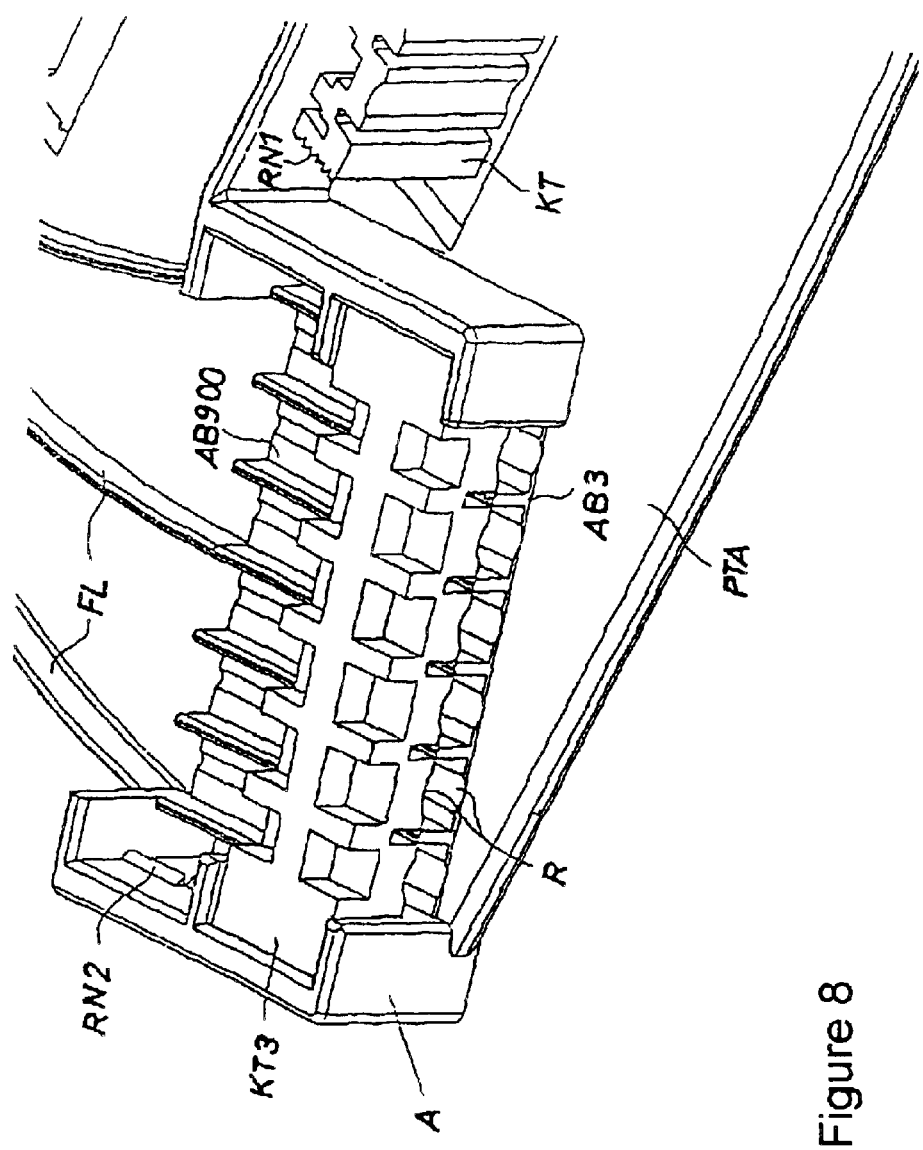
FIG. 8 shows a detail of an accommodating adapter for the introduction of connectors of large diameter.

FIG. 8 shows the accommodating region AB3 covered by way of an adapted clamping part KT3.

By virtue of lateral latching noses RN2 in the mount A and corresponding latching noses RN1 on the sides of the clamping parts KT, the connectors introduced are clamped with corresponding latching action. The radii R of the accommodating regions are likewise adapted to the connector diameter. The accommodating region AB900, which is located at the rear, is not used in this case. Guide rails FL make it easier for the optical waveguides to be introduced into the cassette base plate.

Figure 9:
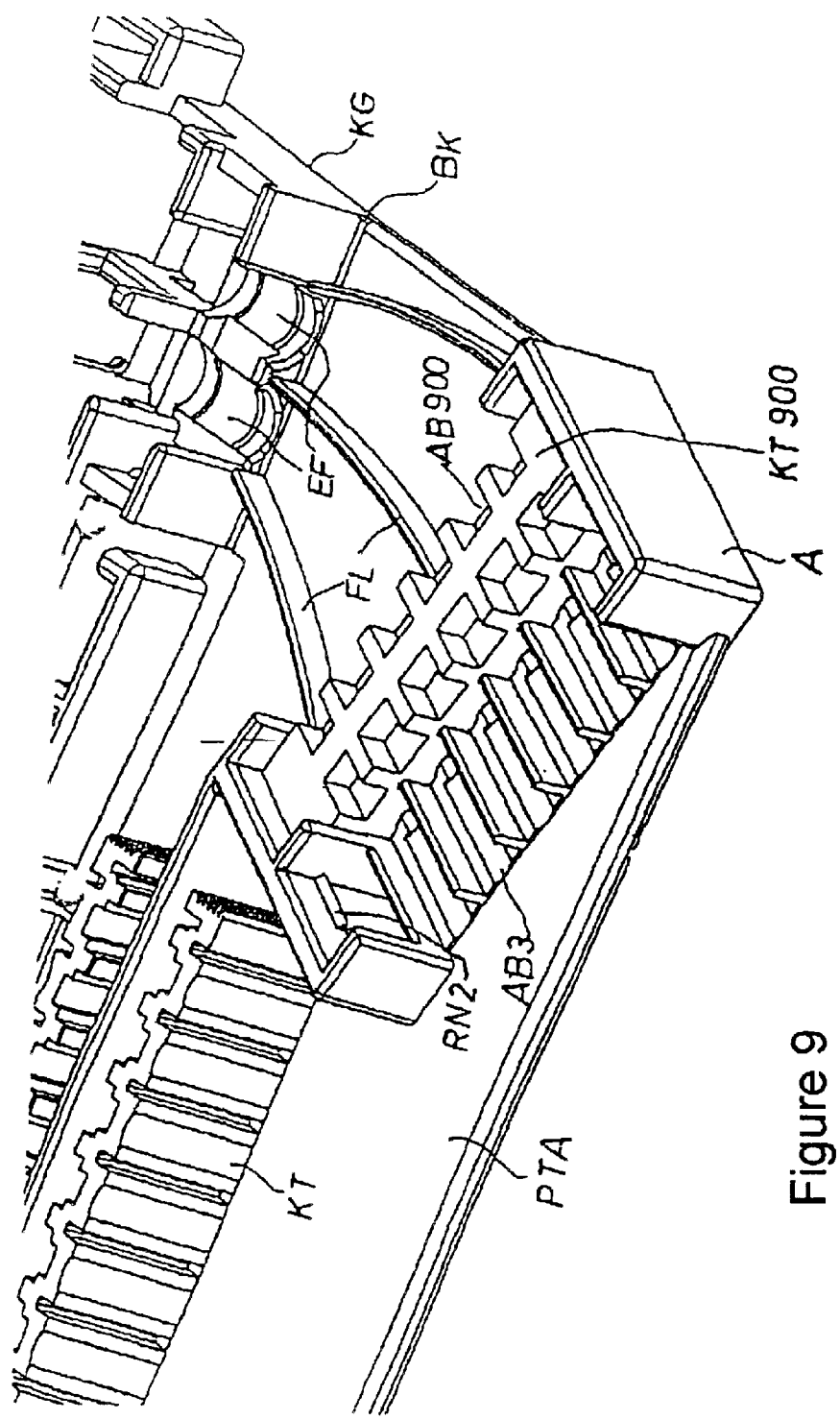
FIG. 9 shows a detail of an accommodating adapter for the introduction of connectors of small diameter.

FIG. 9, then, shows an inlet port for connectors in the accommodating region AB900, a correspondingly adapted clamping part KT900 then also having been inserted here. It is also shown here that the optical waveguides are guided by way of guide rails FL up to the inlet port EF of the cassette base plate KG.

Figure 10:
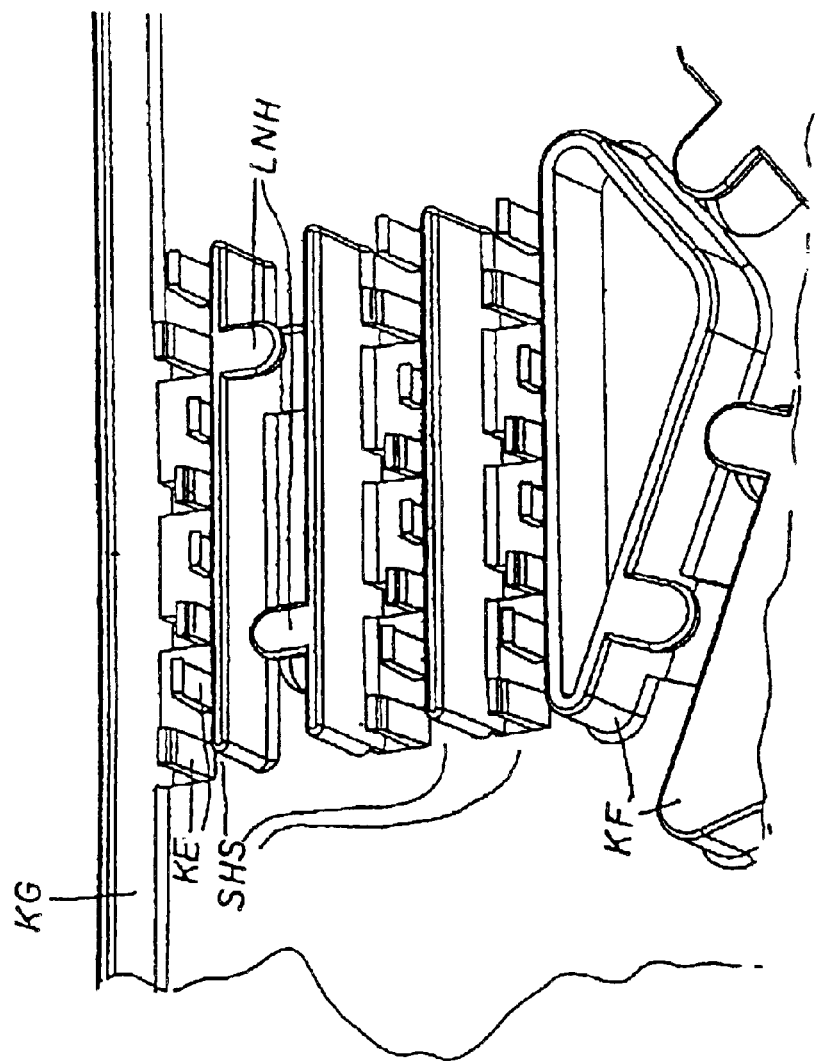
FIG. 10 shows an arrangement of splice-protection holders for shrink-tube splices.

FIG. 10 shows a central region of the cassette base plate KG with splice-protection holders SHS for shrink-tube splices, which are fixed with the aid of resilient clamping elements KE. Illustrated therebeneath are the cross-form guide elements KF with the holding-down means NH and a longitudinal lead-through, running between the splice-protection holders SHS, for optical waveguides with holding-down means LNH.

Figure 11:
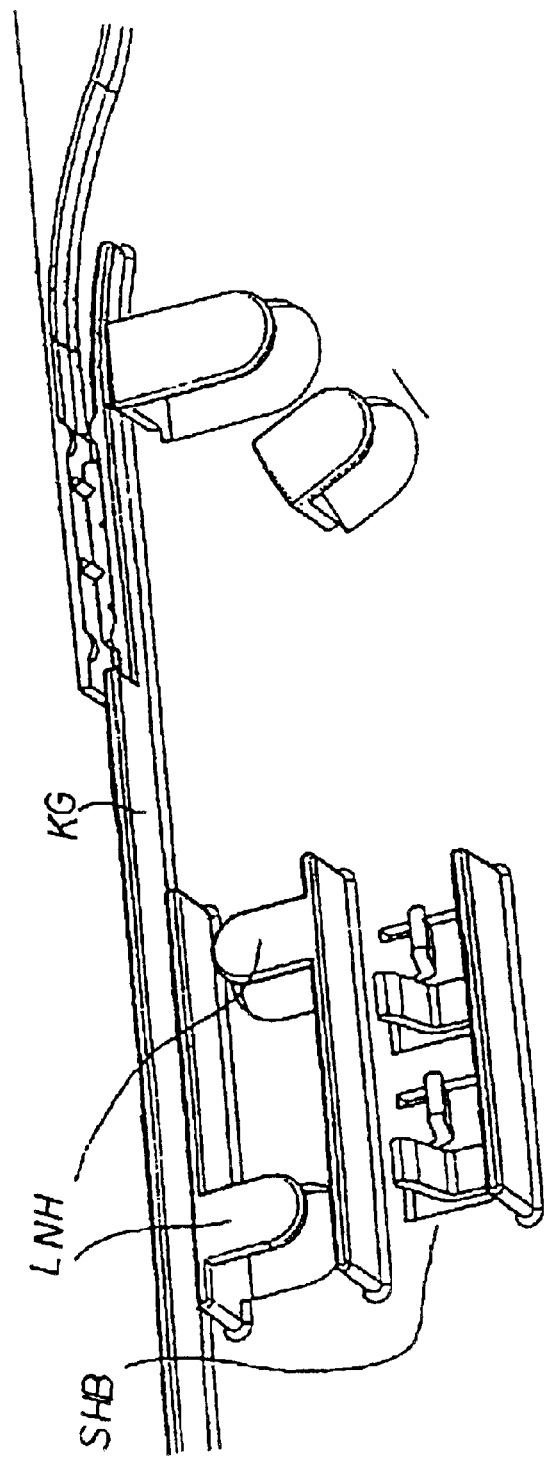
FIG. 11 shows an arrangement of splice holders for optical waveguide strips.

FIG. 11 shows another central region of the cassette base plate KG with a splice-protection holder SHF for optical waveguide strips and a longitudinal guide for optical waveguides with holding-down means LNH.

Figure 12:
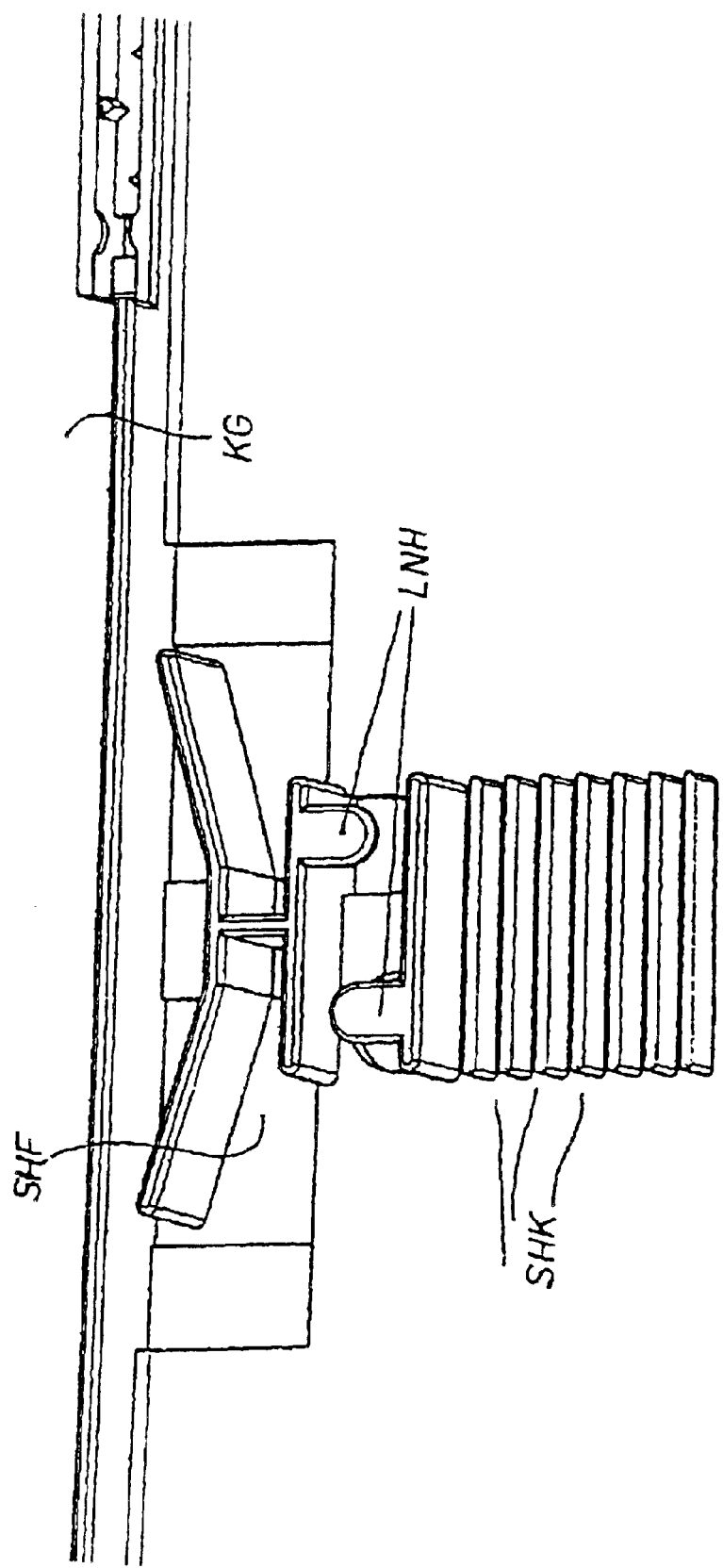
FIG. 12 shows the arrangement of splice holders for crimp splices and Fibrlok™ devices.

FIG. 12 shows the combination of different splice-protection holders, e.g., splice-protection holders SHF for so-called Fibrlok™ devices (available from 3M) and splice-protection holders SHK for crimp splices. Introduced therebetween is a longitudinal guide for the through-passage of optical waveguides with holding-down means LNH.

Figure 13:
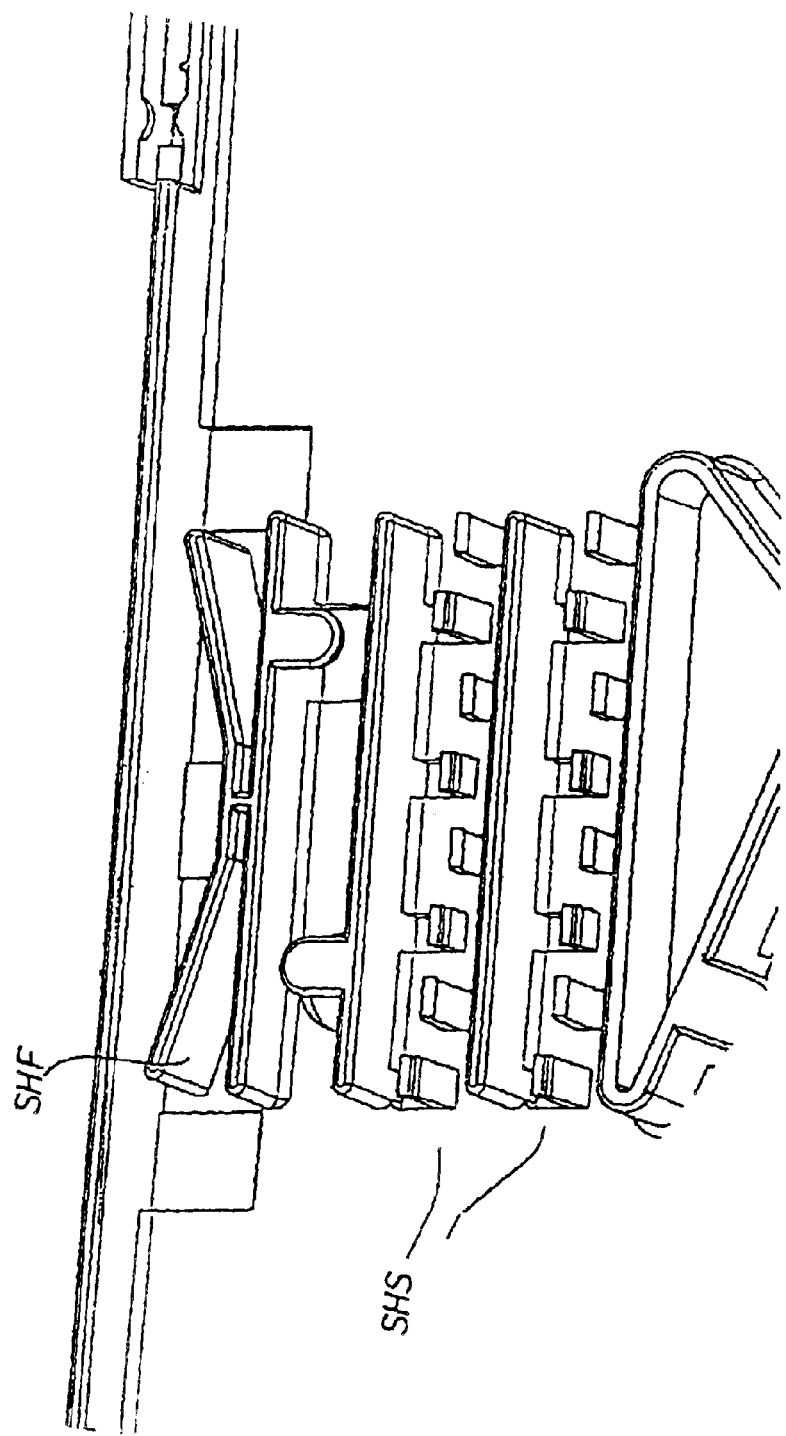
FIG. 13 shows an arrangement of splice-protection holders for shrink-tube splices and Fibrlok™ devices.

FIG. 13, in turn, shows a possible combination of splice-protection holders, in this case splice-protection holders SHF for Fibrlok™ devices and splice-protection holders SHS for shrink-tube splices.

Figure 14:
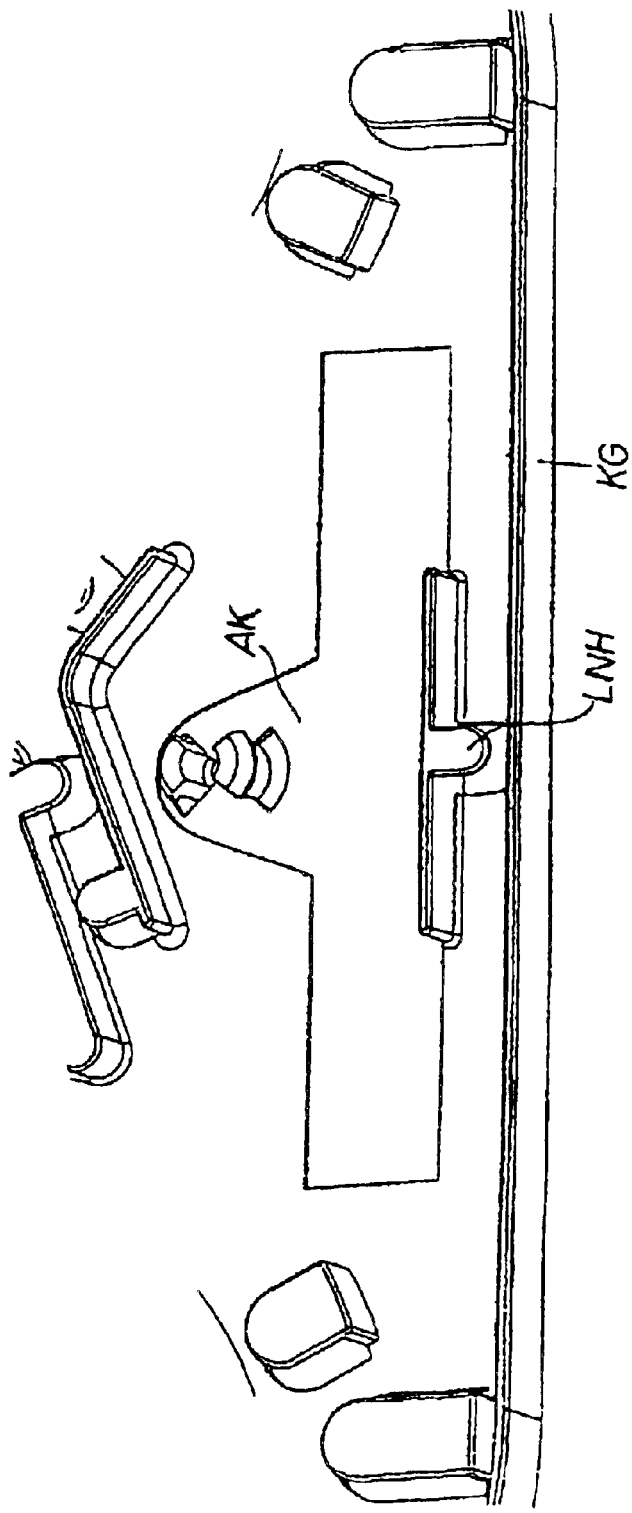
FIG. 14 shows a mount for optical waveguide couplers.

FIG. 14 illustrates that it is also possible to provide fixing arrangements for other optical waveguide elements, e.g., a mount AK for an optical coupler. A longitudinal lead-through with holding-down means LNH is routed along the longitudinal side of the cassette base plate KG.

Figure 15:
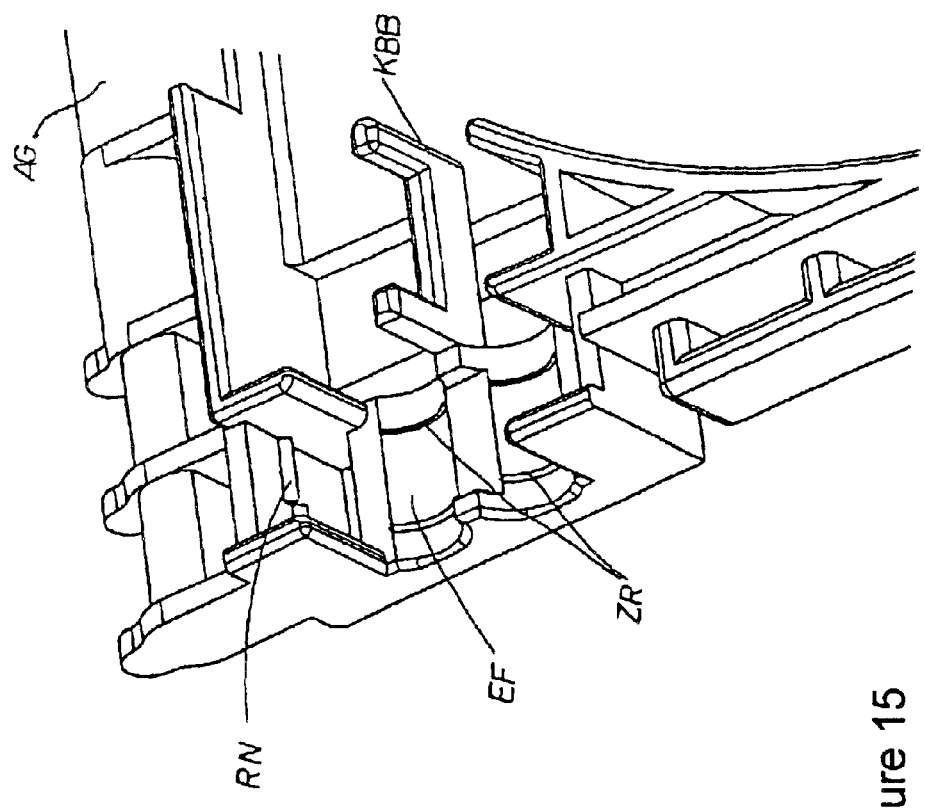
FIG. 15 shows an inlet and/or outlet region of the cassette base plate.

FIG. 15 shows the region of an inlet port EF on the cassette base plate KG in which it is possible to insert appropriate mounts for adaptation to the type of optical waveguide which is to be introduced. Arranged in the side walls of the inlet ports EF are latching noses RN by means of which the mounts are locked and fixed. In the openings of the inlet ports EF, rows of teeth ZR, for example, are provided in the radial regions and act counter to tensile stressing in the axial direction. Provided in the inner region of the inlet ports EF are rails and/or arrangements KBB on which it is possible to fasten cable ties for fixing optical waveguides which have been introduced.

Figure 16:
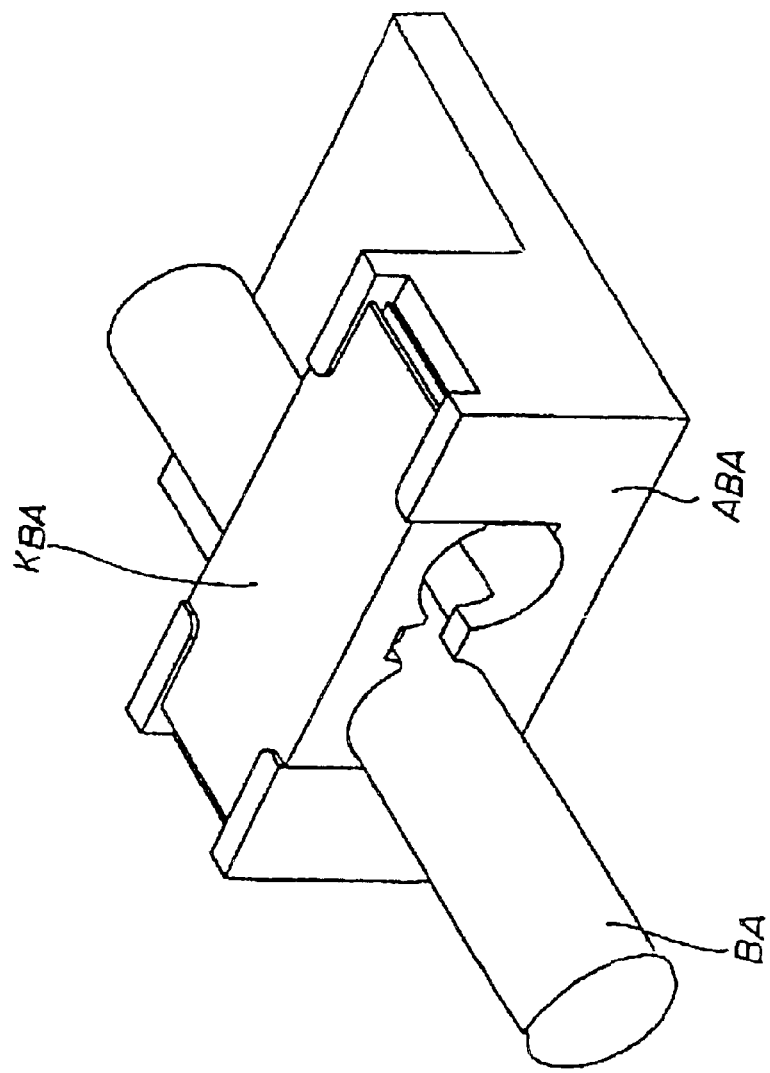
FIG. 16 shows a mount for bundle tubes.

FIG. 16 shows a mount ABA for the introduction of bundle tubes BA. This mount ABA is inserted into an inlet port EF according to FIG. 15 and latched laterally. Following the introduction of the bundle tube BA, a clamping element KBA is fitted in order to fix the bundle tube BA.

Figure 17:
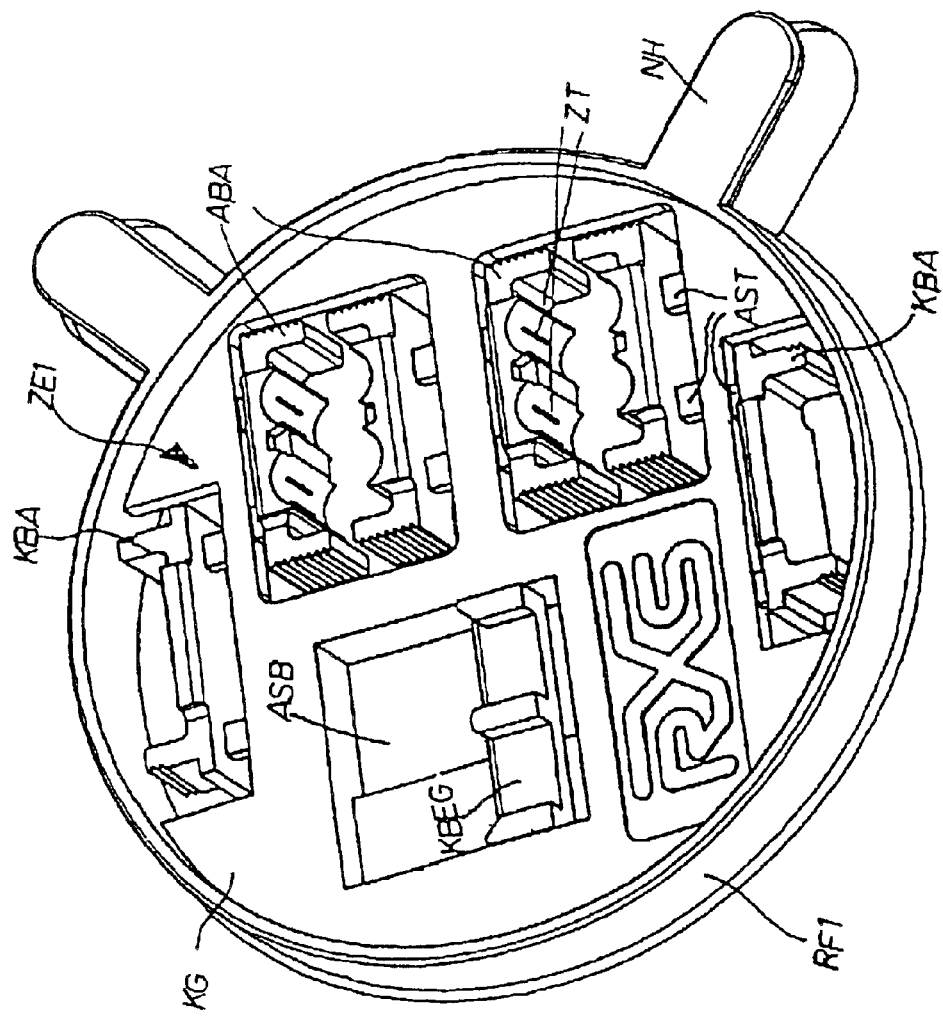
FIG. 17 shows additional elements within a circular guide element.

FIG. 17 shows the interior of a circular guide element RF1, the boundary wall being of a diameter which corresponds to the minimum permissible bending radius for optical waveguides. Holding-down means are attached to the outside for the optical waveguides introduced. In the interior of said circular guide element RF1, then, additional elements are arranged such that they can be removed, to be precise they are either latched in or fixed by way of break-out webs AST. If required, then, these additional elements may be removed and used for the appropriate application. Fixed in said interior, for example, are two mounts ABA for bundle tubes and the two associated clamping elements KBA. Also located therein are a cutout ASB and a support KBEG for the insertion of a fastening element KBE (see FIG. 20). The fastening element KBE is latched in here such that it projects rearward through the cassette base plate KG.

Figure 18:
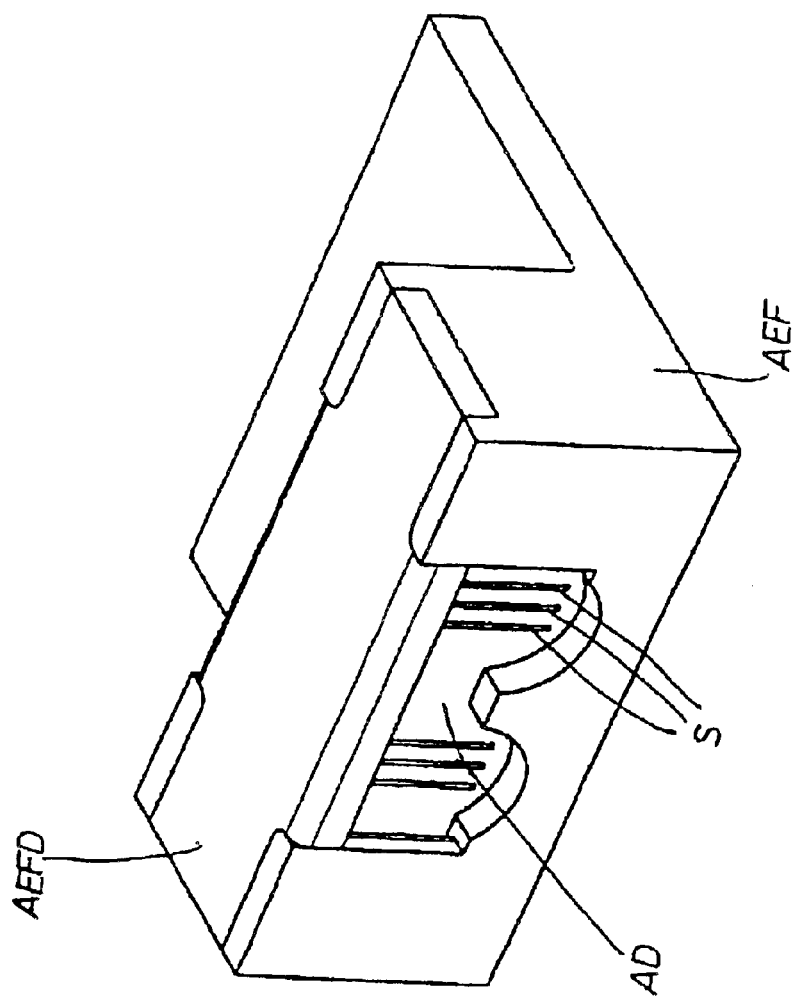
FIG. 18 shows a mount for individual fibers.

FIG. 18 illustrates a further mount AEF, which can likewise be inserted into an inlet port EF. It contains an adapter AD for the introduction of individual fibers or optical waveguide strips, which are introduced through slits S. The slits S are closed off at the top by a cover AEFD.

Figure 19:
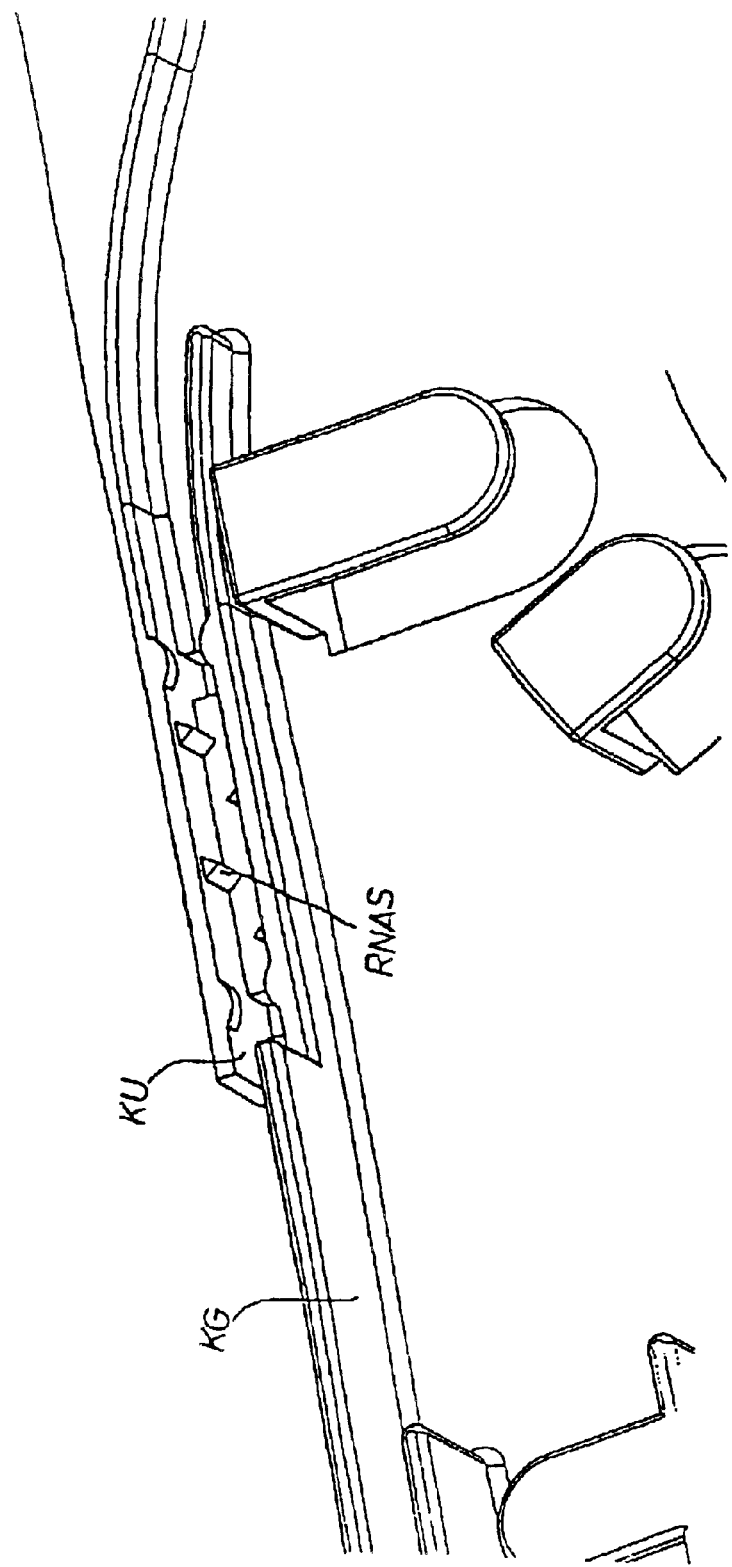
FIG. 19 shows a cassette transition.

FIG. 19 demonstrates that additionally arranged in the central region of the narrow side of the cassette base plate KG is an opening for a cassette transition KU for optical waveguides. This cassette transition KU is on the pivoting side of the cassette base plate KG, with the result that it is not possible to damage the led-out optical waveguides in the composite stack arrangement of a plurality of cassette base plates during swing action. The optical waveguides preferably make the transition in buffer tubes, which are fixed on latching noses RNAS.

Figure 20:
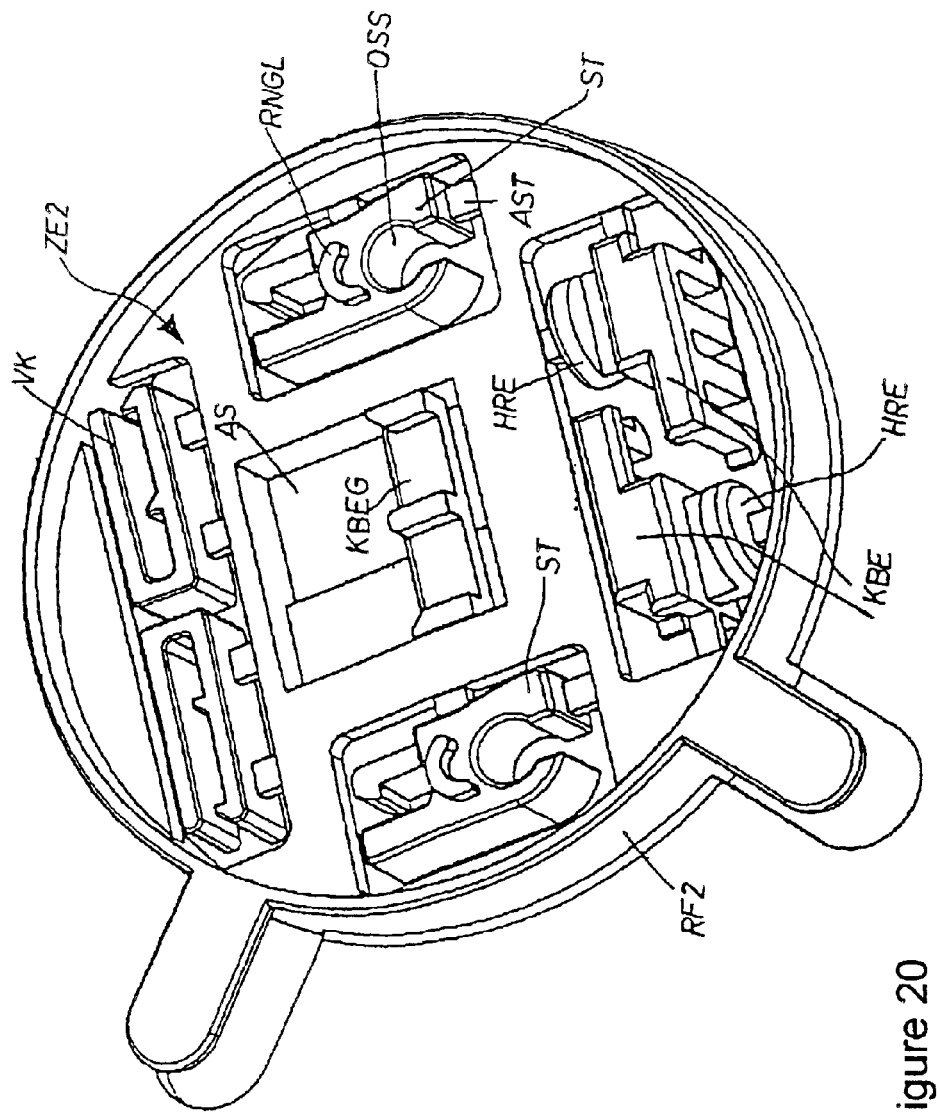
FIG. 20 shows additional elements within a circular guide element.

FIG. 20 shows a second circular guide element RF2, in which, in turn, different individual parts are arranged as removable additional elements. Hinge parts ST, for example, are arranged here via break-out webs AST, which are required for the swing-action stack construction of a plurality of cassette base plates KG. These hinge parts ST are clipped onto the hinge pins SS1 and SS2 by way of their openings OSS (see also FIG. 22). Provided on each hinge part ST is a stop RNGL, which prevents a swung-out cassette base plate from being swung open too far. Also located here are cassette-fastening elements KBE, by means of which the cassette base plate can be fitted, and fastened, on framework parts. For this purpose, the undercut latching elements HRE are introduced into corresponding mating latching formations. Finally, closure clips VK are provided, these being latched into the outer fastening elements BE of the cassette base plates in order that a stack comprising a plurality of cassette base plates can be clamped together to form a fixed unit.

Figure 21:
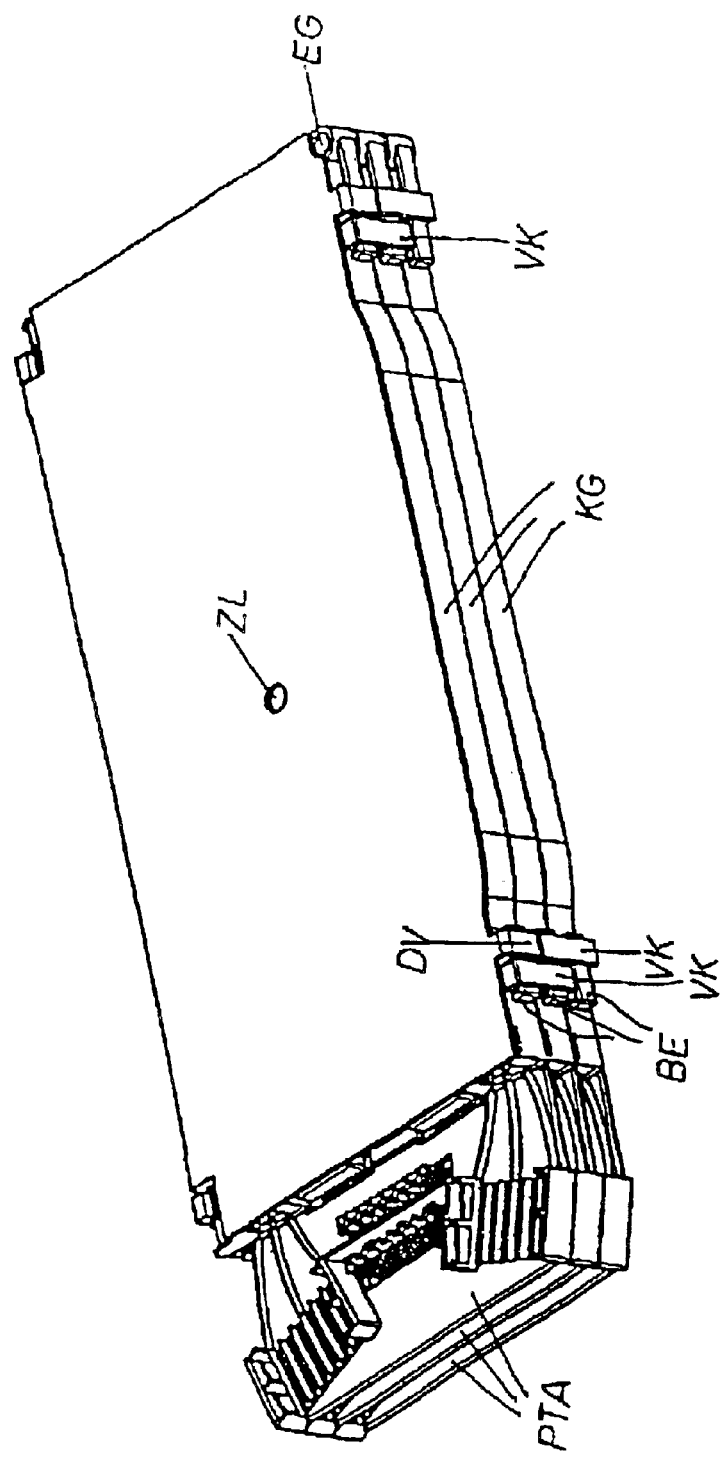
FIG. 21 shows a stack of cassette base plates with accommodating adapters.

FIG. 21, then, shows a stack of, for example, three cassette base plates KG, which are additionally provided with accommodating adapters PTA. The closure clips VK, included as additional elements, have been latched into the fastening elements BE of the cassette base plates KG and the uppermost cassette base plate KG is covered by a cover D, the closure DV of which likewise engages in a fastening element BE. This makes it possible to assemble a compact unit which can be mounted rotatably, for example, in a continuous corner articulation EG.

Figure 22:
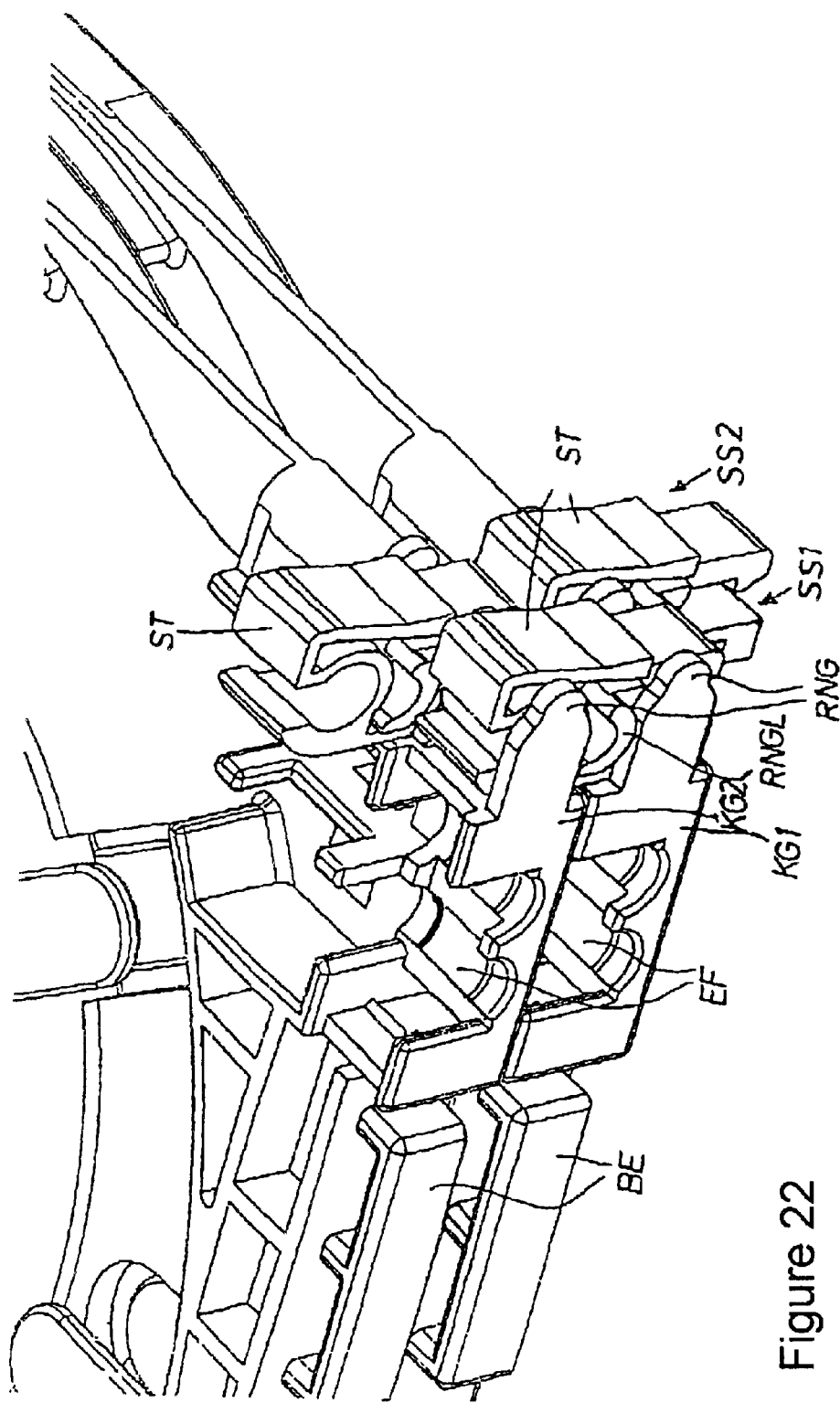
FIG. 22 shows the end view of the stack in FIG. 21.

FIG. 22 shows, in detail form, the arrangement of the hinge part ST attached with latching action in the direction of the hinge pins SS1 and SS2 of the cassette base plate. When the cassette base plates KG1, KG2 etc. are swung open, the lateral latching noses RNG of the cassette base plates slide in supports RNGL of the hinge parts ST until they come to a stop.

Figure 23:
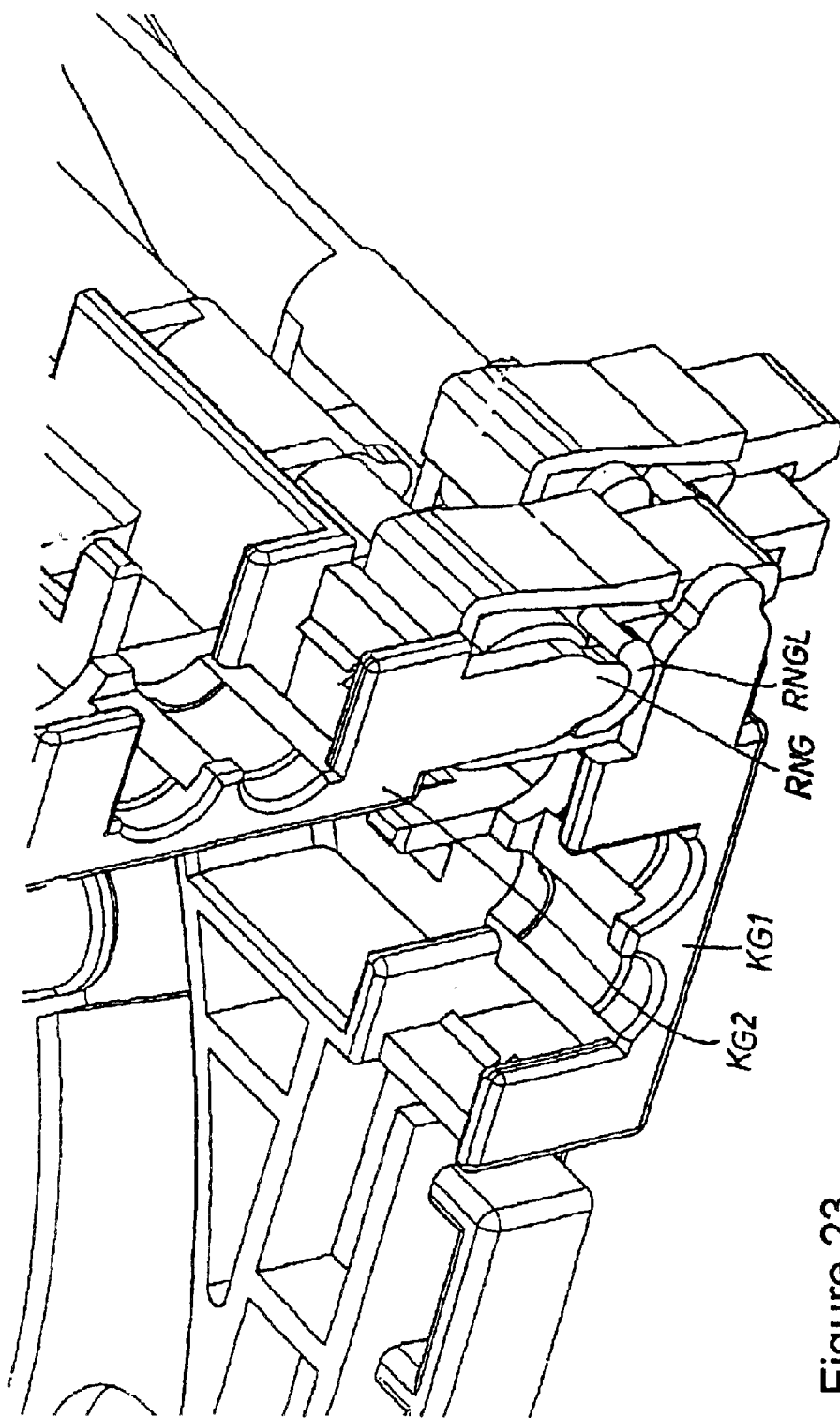
FIG. 23 shows the arrangement in FIG. 22 with a cassette base plate in the upright position.

FIG. 23 illustrates that, for example, the cassette base plate KG2 has been swung open through 90° C., the latching noses RNG sliding in supports RNGL until they come to a stop.

Figure 24:
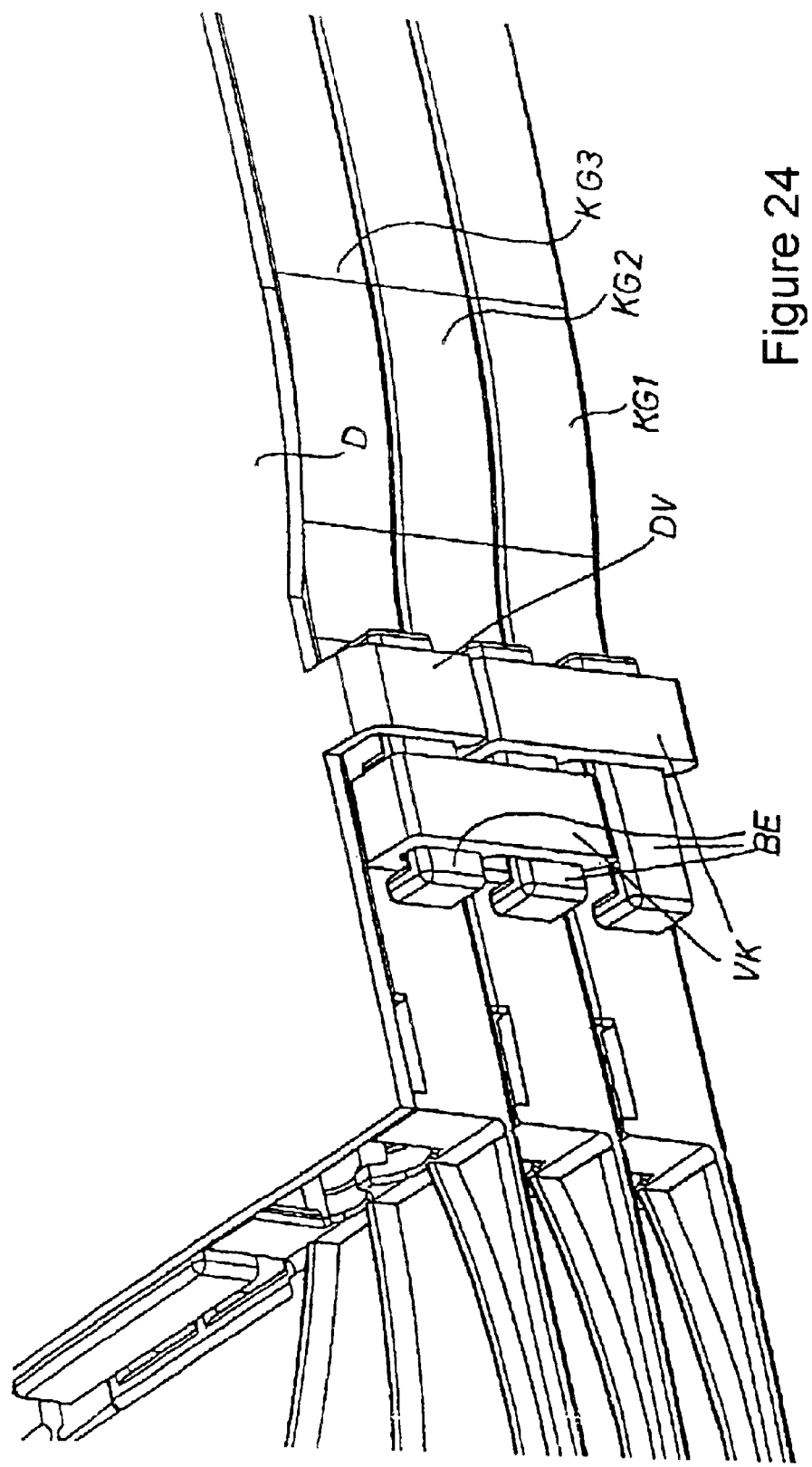
FIG. 24 shows the locking side of the arrangement in FIG. 21.

FIG. 24, once again, shows the opposite side of the stack of cassette base plates KG1, KG2 and KG3, from which the reciprocal interengagement of the closure clips VK in the fastening elements BE can clearly be seen. In this case, the cover closure engages in the fastening element BE of the uppermost cassette base plate KG3.

Figure 25:
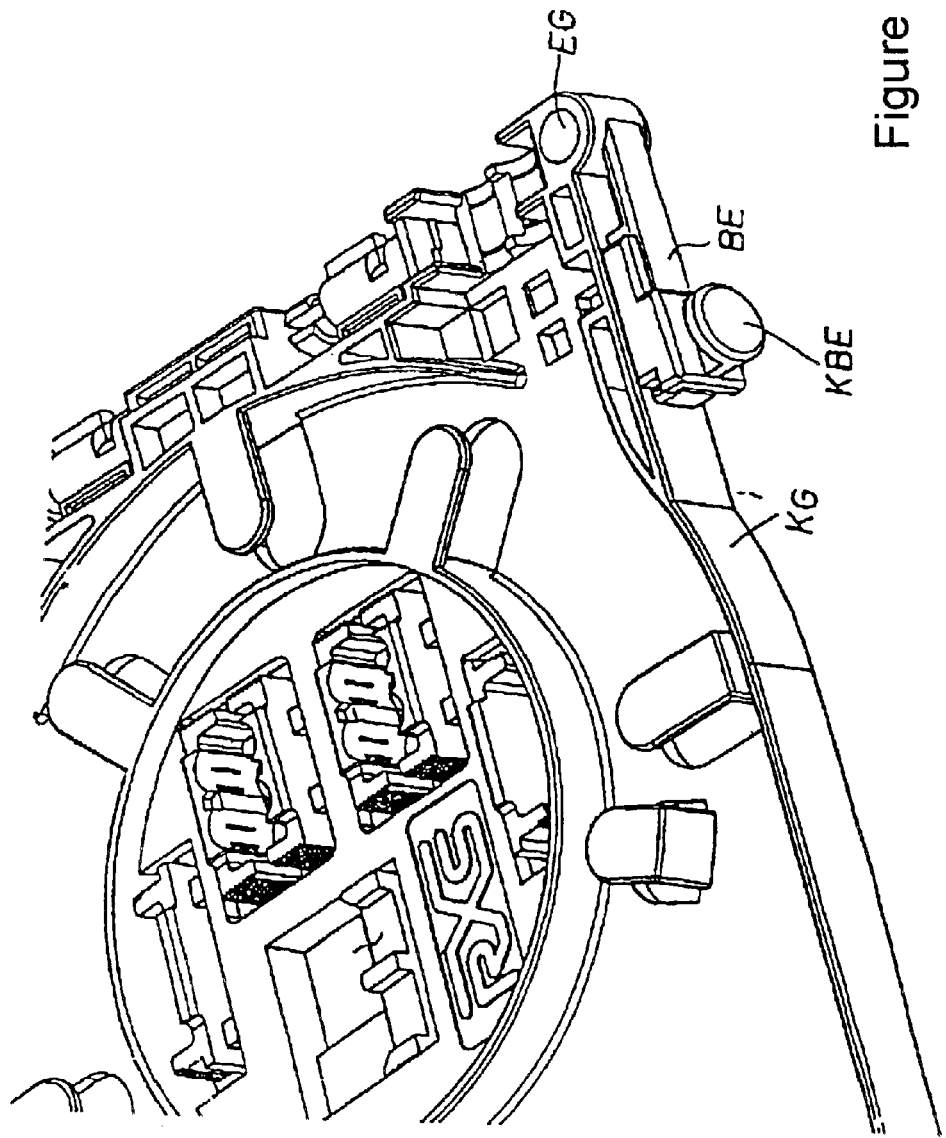
FIG. 25 shows the insertion of a fastening element on the narrow side of the cassette base plate.

FIG. 25 shows a cassette-fastening element KBE fitted into a fastening element BE on the outer longitudinal side of the cassette base plate KG. The cassette base plate KG can be fitted into a corresponding support of a framework by way of the undercut knob of the cassette element KBE.

Figure 26:
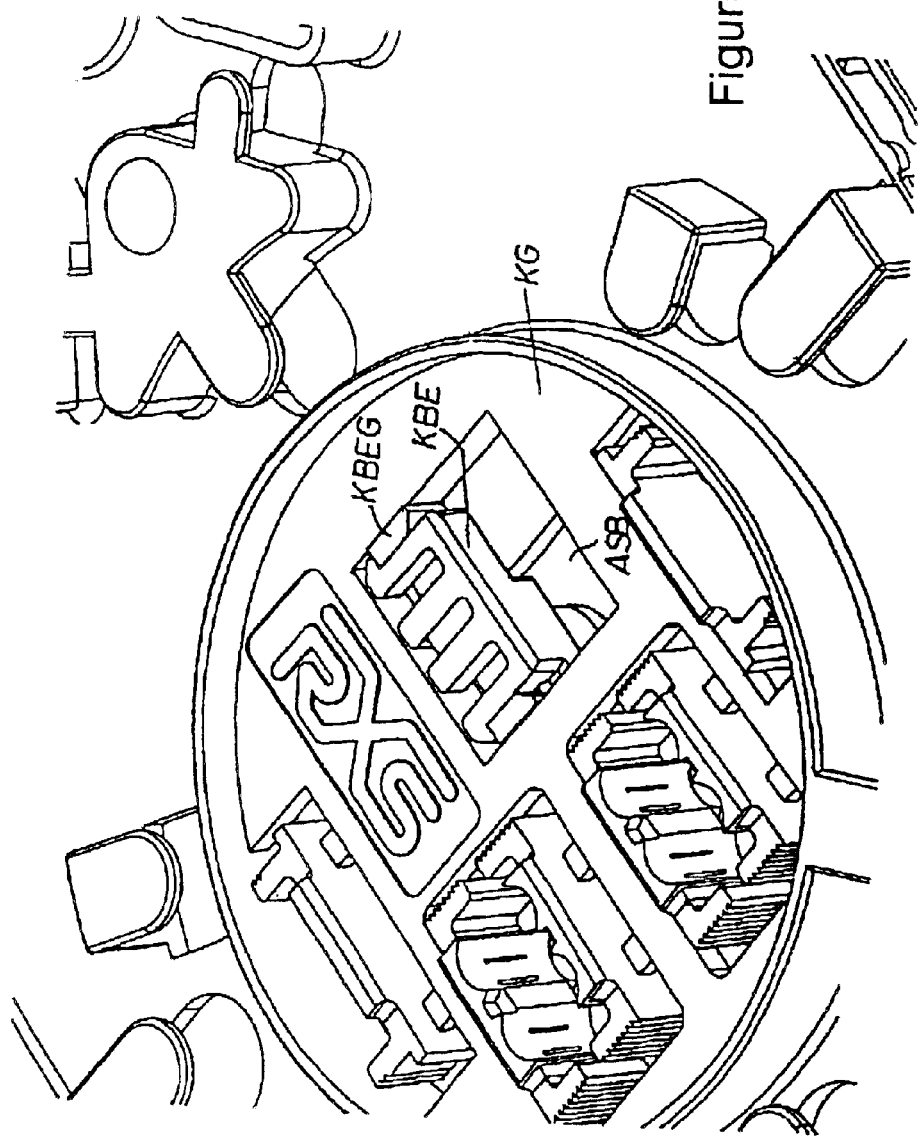
FIG. 26 shows, as additional elements, the mounts for the inlet ports and the insertion of a fastening element on the underside of the cassette base side.

FIG. 26 shows that the cassette fastening element KBE can also be latched in a cutout ASB in the base part of the cassette base plate KG, the cassette-fastening element KBE being latched in the support KBEG.

Figure 27:
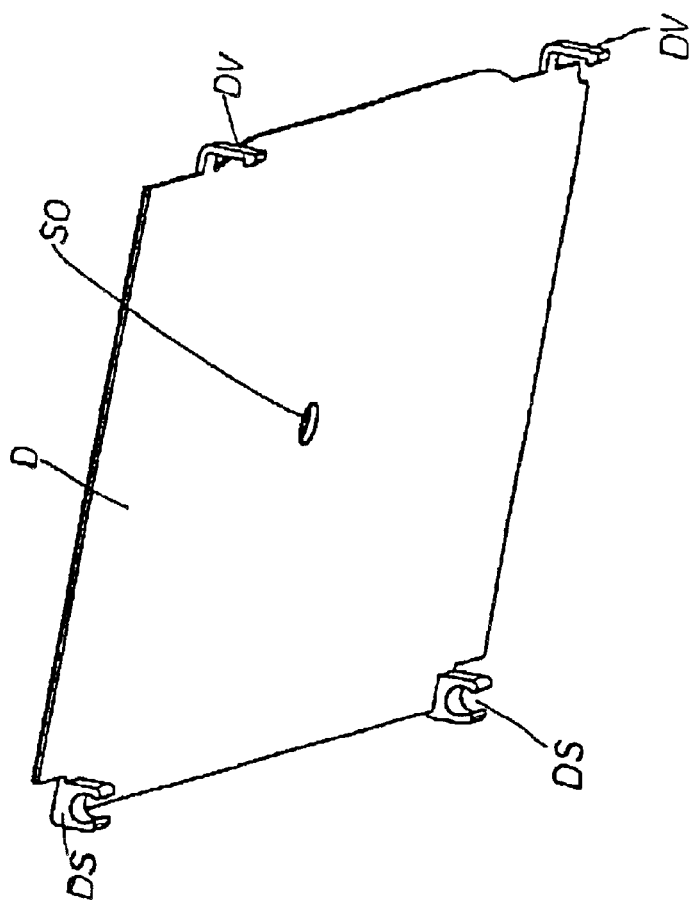
FIG. 27 shows the configuration of a cover for the cassette base plate.

FIG. 27 shows the configuration of a cover D for the cassette base plate which is latched in by way of cover hinges DS. The opposite side is provided with the cover closures DV. It is possible for a mandrel to be guided through the central opening SO and to have a plurality of cassette base plates stacked on it.

Figure 28:
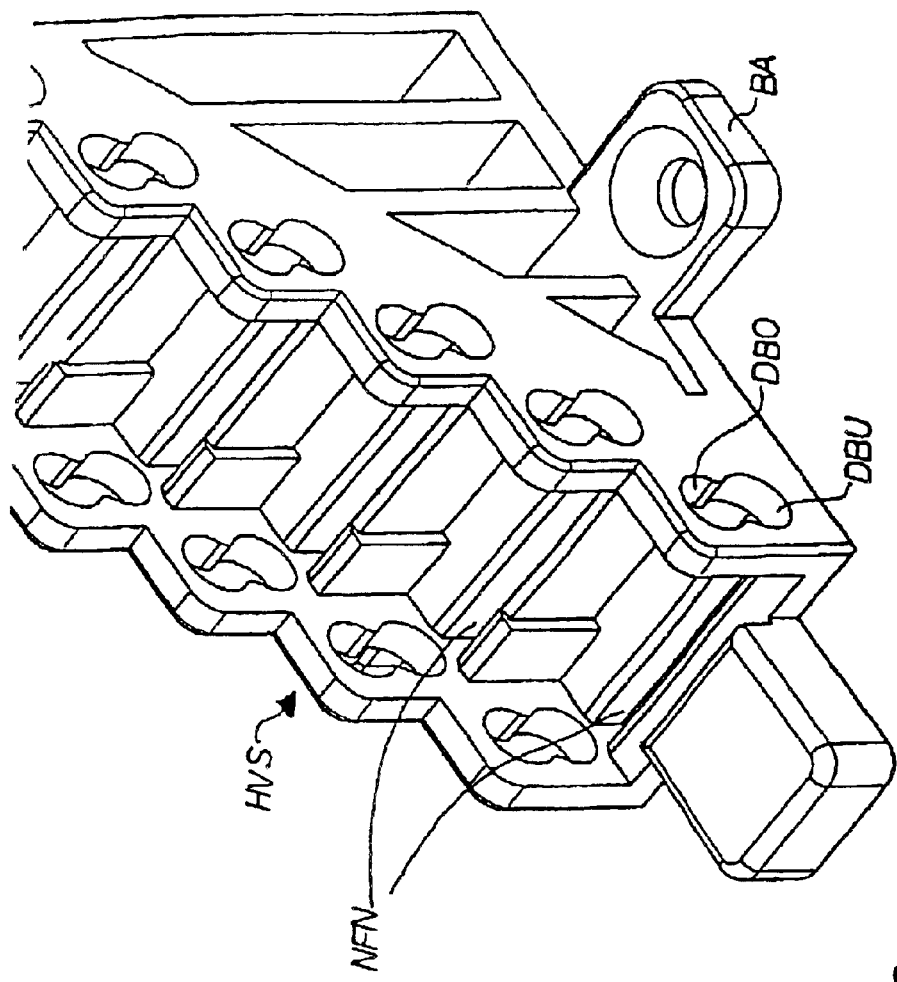
FIG. 28 shows details of the holder for vertical pivoting elements.

FIG. 28 shows, once again, in detail form, the step-like holder HVS for accommodating vertical pivoting elements which are latched into the double bores DBO-DBU by way of their resilient elements. Also provided are transversely running grooves NFN for the insertion of the fixing noses FN of the vertical pivoting elements, in order for it to be possible for the cassette base plates to be retained in the vertical position.

What is claimed is:

1. A cassette for accommodating optical waveguides with excess lengths and optical waveguide splices, comprising:
    a cassette base plate;
    two circular guide elements arranged on the cassette base plate and at least one cross-form guide element located therebetween;
    break-out webs disposed within the circular guide elements;
    splice-protection holders for accommodating splice-protection elements;
    at least one pivoting element for pivoting of the cassette; and
    at least one inlet region for the introduction of optical waveguides into the cassette.

2. The cassette as claimed in claim 1, wherein the at least one pivoting element is arranged on a narrow side of the cassette.

3. The cassette as claimed in claim 2, further comprising an accommodating adapter disposed on the narrow side of the cassette for connectorized optical waveguides.

4. The cassette as claimed in claim 1, further comprising a vertically running opening for accommodating a stacking mandrel.

5. The cassette as claimed in claim 1, further comprising a cover that is pivotable along a hinge side of the cassette.

6. The cassette as claimed in claim 5, further comprising at least one hinge pin disposed along the hinge side of the cassette.

7. The cassette as claimed in claim 6, wherein the at least one hinge pin is further subdivided into two hinge pins by a web.

8. The cassette as claimed in claim 1, further comprising a corner articulation disposed on at least one corner of the cassette.

9. The cassette as claimed in claim 1, further comprising holding-down means disposed on at least one of the circular guide elements, the cross-form guide element, at least one lateral wall of the cassette, and a base part of the cassette.

10. The cassette as claimed in claim 1, wherein the splice-protection holders accommodate one or more optical splices.

11. The cassette as claimed in claim 1, further comprising a mounting element for holding optical waveguide couplers.

12. The cassette as claimed in claim 1, wherein the at least one inlet region comprises four inlet regions and wherein at least one inlet region is arranged at a corner region of the cassette.

13. The cassette as claimed in claim 1 further comprising accessories removably fixed to the cassette by the break-out webs.

14. The cassette as claimed in claim 13, wherein the accessories are disposed in at least one of the circular guide elements.

15. The cassette as claimed in claim 1, further comprising fastening elements disposed on the cassette.

16. The cassette as claimed in claim 3, wherein the accommodating adapter has accommodating regions adjacent one another to accommodate connectors of different diameters.

17. The cassette as claimed in claim 16, wherein the accommodating regions are formed by parallel grooves that generally correspond to the diameters of the connectors.

18. The cassette as claimed in claim 17, wherein each groove has at least one stepped formation from a first diameter to a second diameter.

19. The cassette as claimed in claim 13, wherein the accessories include adapted clamping parts, the clamping parts being removably fixed on an accommodation adapter to hold at least one connector.

20. The cassette as claimed in claim 1, wherein the pivoting element has at least one hinge element, the hinge element having latchable resilient elements and a fixing nose to allow for vertical pivoting.

21. The cassette as claimed in claim 20, further comprising a holder to engage the latchable resistant elements, the holder having double bores in communication with one another and arranged in a staircase configuration to accommodate pivoting elements of a plurality of cassettes.

22. The cassette as claimed in claim 1, further comprising securing elements at the at least one inlet region to secure the optical waveguides.

23. The cassette as claimed in claim 1, further comprising a mount and a corresponding covering clamping element to secure bundle tubes, the mount and covering clamping element being insertable into one or more insert ports and removably secured in at least one circular guide element.

24. The cassette as claimed in claim 1, further comprising at least one cassette-transition opening disposed in a central region of the cassette, the cassette-transition opening having protrusions therein to engage buffer tubes introduced into the cassette-transition openings opening.

25. The cassette as claimed in claim 1, further comprising at least one cassette-fastening element removably fixed on a circular guide element, the at least one cassette-fastening element having an undercut latching element to engage a frame.

26. The cassette as claimed in claim 1, further comprising hinge parts removably fixed in at least one circular guide element, the hinge parts configured to engage the cassette for the construction of swing-action cassette stacks, whereby the hinge parts have latching-nose supports as stops for latching noses of a corresponding cassette.

27. The cassette as claimed in claim 1, further comprising closure clips removably fixed in at least one circular guide element, the closure clips configured to engage one or more lateral fastening elements disposed on the cassette.

* * * * *